US010472452B2

(12) United States Patent
Kato et al.

(10) Patent No.: US 10,472,452 B2
(45) Date of Patent: Nov. 12, 2019

(54) PROCESS FOR PRODUCING THERMOPLASTIC ELASTOMER, AND THERMOPLASTIC ELASTOMER

(71) Applicants: Kaneka Corporation, Osaka (JP); COMPAGNIE GENERALE DES ETABLISSEMENTS MICHELIN, Clermont-Ferrand (FR)

(72) Inventors: Yasunaka Kato, Osaka (JP); Yoshihiro Ikari, Osaka (JP)

(73) Assignees: KANEKA CORPORATION, Osaka (JP); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 62 days.

(21) Appl. No.: 15/820,842

(22) Filed: Nov. 22, 2017

(65) Prior Publication Data

US 2018/0094094 A1 Apr. 5, 2018

Related U.S. Application Data

(63) Continuation of application No. PCT/JP2016/065467, filed on May 25, 2016.

(30) Foreign Application Priority Data

May 26, 2015 (JP) ................................ 2015-106721

(51) Int. Cl.

| | |
|---|---|
| ***C08F 297/08*** | (2006.01) |
| ***C08F 297/00*** | (2006.01) |
| ***C08F 6/00*** | (2006.01) |
| ***C08F 8/22*** | (2006.01) |
| ***C08F 8/14*** | (2006.01) |

(52) U.S. Cl.

CPC .............. *C08F 297/08* (2013.01); *C08F 6/00* (2013.01); *C08F 8/14* (2013.01); *C08F 8/22* (2013.01); *C08F 297/00* (2013.01); *C08F 2810/30* (2013.01); *C08F 2810/50* (2013.01)

(58) Field of Classification Search

CPC .................................................... C08F 297/00

See application file for complete search history.

(56) References Cited

U.S. PATENT DOCUMENTS

| | | | |
|---|---|---|---|
| 4,930,285 | A | 6/1990 | Ward |
| 5,013,793 | A | 5/1991 | Wang et al. |
| 5,095,673 | A | 3/1992 | Ward |
| 5,162,445 | A | 11/1992 | Powers et al. |
| 5,376,503 | A | 12/1994 | Audett et al. |
| 5,426,167 | A | 6/1995 | Powers et al. |
| 5,428,111 | A | 6/1995 | Faust et al. |
| 5,430,118 | A | 7/1995 | Powers et al. |
| 5,459,174 | A | 10/1995 | Merrill et al. |
| 5,473,017 | A | 12/1995 | Wang |
| 5,548,023 | A | 8/1996 | Powers et al. |
| 5,548,029 | A | 8/1996 | Powers et al. |
| 5,567,775 | A | 10/1996 | Wang et al. |
| 5,585,225 | A | 12/1996 | Audett et al. |
| 5,585,416 | A | 12/1996 | Audett et al. |
| 5,587,261 | A | 12/1996 | Audett et al. |
| 5,591,551 | A | 1/1997 | Audett et al. |
| 5,621,044 | A | 4/1997 | Wang |
| 5,631,316 | A | 5/1997 | Costemalle et al. |
| 5,654,379 | A | 8/1997 | Powers et al. |
| 5,824,717 | A | 10/1998 | Merrill et al. |
| 5,959,049 | A | 9/1999 | Powers et al. |
| 6,008,282 | A | 12/1999 | Wang et al. |
| 6,013,727 | A | 1/2000 | Dharmarajan et al. |
| 6,265,486 | B1 | 7/2001 | Shaffer et al. |
| 6,346,571 | B1 | 2/2002 | Dharmarajan et al. |
| 6,444,768 | B1 | 9/2002 | Webb et al. |
| 2002/0173612 | A1 | 11/2002 | Webb et al. |
| 2004/0054103 | A1 | 3/2004 | Webb et al. |
| 2004/0059076 | A1 | 3/2004 | Webb et al. |
| 2011/0294924 | A1 | 12/2011 | Shaffer et al. |
| 2013/0261250 | A1 | 10/2013 | Stojcevic et al. |

FOREIGN PATENT DOCUMENTS

| | | | |
|---|---|---|---|
| CN | 1502639 | A | 6/2004 |
| JP | H02-150408 | A | 6/1990 |
| JP | H09-510996 | A | 11/1997 |
| JP | H11-189630 | A | 7/1999 |
| JP | 2000-504358 | A | 4/2000 |
| JP | 2001-114974 | A | 4/2001 |
| JP | 2002-534543 | A | 10/2002 |
| JP | 2005-535746 | A | 11/2005 |
| JP | 2013-527304 | A | 6/2013 |
| JP | 2013-528673 | A | 7/2013 |
| JP | 2015-083627 | A | 4/2015 |
| WO | 00/40631 | A1 | 7/2000 |

OTHER PUBLICATIONS

Extended European Search Report issued in European Application No. 16800062.8, dated Dec. 12, 2018 (5 pages).

International Preliminary Report on Patentability issued in International Application No. PCT/JP2016/065467, dated Dec. 7, 2017 (7 pages).

International Search Report issued in International Application No. PCT/JP2016/065467, dated Jul. 19, 2016 (2 pages).

*Primary Examiner* — Jeffrey C Mullis

(74) *Attorney, Agent, or Firm* — Osha Liang LLP

(57) ABSTRACT

A method for producing a thermoplastic elastomer includes forming a first block by copolymerizing a C4-C7 isoolefin monomer and alkylstyrene in the presence of a polymerization initiator; and forming a second block by polymerizing aromatic vinyl monomers. The thermoplastic elastomer comprises the first block and the second block. An amount of unreacted portion of the alkylstyrene during the formation of the first block is maintained at a molar ratio of not more than 1/90 relative to a total amount of the isoolefin monomer. The alkylstyrene is represented by the general formula (1), and the polymerization initiator is represented by the general formula (2).

17 Claims, No Drawings

PROCESS FOR PRODUCING THERMOPLASTIC ELASTOMER, AND THERMOPLASTIC ELASTOMER

TECHNICAL FIELD

One of more embodiments of the invention relate to (i) a method for producing a thermoplastic elastomer including (a) a polymer block that contains alkylstyrene and an isoolefin monomer as main components and (b) a polymer block that contains an aromatic vinyl monomer as a main component, and (ii) the thermoplastic elastomer.

BACKGROUND

Polymers each of which contains, as a main component, an isoolefin monomer typified by isobutylene are widely used for various sealing members due to their high gas barrier property. Known examples of such polymers include a styrene-b-isobutylene-b-styrene block copolymer (SIBS), an isobutylene/isoprene polymer, an isobutylene/isoprene polymer halogenated by chlorine or bromine, and an isobutylene/p-methyl styrene polymer halogenated by chlorine or bromine.

SIBS consists of (i) a low Tg block that is a middle block and is constituted by an isobutylene polymer and (ii) a high Tg block that is a both end block and is constituted by a styrene polymer. Such a structure causes a thermoplastic elastomer to display a characteristic of having rubber elasticity at a room temperature and being liquefied at a high temperature of not less than 100° C. The SIBS is known to display, especially at the room temperature, an excellent dynamic property of having both plasticity and a strength.

Patent Literature 1 discloses a method for producing a block copolymer including (i) a block that contains isobutylene as a main component and (ii) a block that contains an aromatic vinyl monomer as a main component. Patent Literature 1 further discloses that the block that contains isobutylene as a main component may contain, in an amount of not more than 40% by weight, other monomers that are cationically polymerizable. Note, however, that Patent Literature 1 discloses no method for causing the block copolymer to maintain a dynamic property such as a tensile strength also in a case where those monomers are copolymerized.

A brominated isobutylene/p-methyl styrene copolymer, which is one of halogenated isobutylene polymers, is produced by obtaining an isobutylene/p-methyl styrene copolymer by cationic polymerization and then causing a light or radical generator to act on the isobutylene/p-methyl styrene copolymer in the presence of halogen so as to halogenate a p-methyl group (Patent Literature 2). Among isoolefin resins, a halogenated isobutylene polymer is used for various applications. This is because the halogenated isobutylene polymer has a halogen group, which is a functional group, while maintaining its high gas barrier property. For example, it can be expected that introduction of a polar group such as a halogen group into an isoolefin polymer having a low polarity dramatically improves adhesion, to another composition, of the isoolefin polymer into which the halogen group has been introduced. Further, since a halogenated p-halogenated methyl group can easily substitutively react with a nucleophilic reagent in an aprotic polar solvent, various functional groups other than a halogen group can be introduced into the isoolefin polymer. For example, Patent Literature 3 reports that an acryloyl group, which is a functional group having a radical reactivity, is introduced into a halogenated isobutylene/p-methyl styrene copolymer by causing an acrylic compound to act on the halogenated isobutylene/p-methyl styrene copolymer.

Patent Literatures 2 and 4 each disclose a method for producing an isoolefin/p-alkylstyrene copolymer, which is a precursor to such an isoolefin polymer as described above. Note, however, that a molecular weight distribution of the produced copolymer is as wide as approximately 2 according to Patent Literatures 2 and 4 and neither of Patent Literatures 2 and 4 discloses a polymerization method for allowing maintenance of an active terminal that is capable of continuous propagation.

Such a thermoplastic elastomer as described above, the thermoplastic elastomer having a functional group such as a halogen group or an acryloyl group, has adhesion and reactivity and thus is frequently used by being compounded with another material. In this case, the thermoplastic elastomer is required to have shape retentivity at a plasticization temperature or a curing temperature of the another material, i.e., heat resistance. For example, in a case where a composite material of (i) a thermoplastic elastomer having a UV-curable acryloyl group and (ii) vulcanized rubber is assumed and the thermoplastic elastomer can also maintain its shape at approximately 200° C. at which to vulcanize the rubber, variations of a method for molding the composite material are increased.

Patent Literature 5 discloses a method for producing a triblock copolymer including an alkylstyrene/isoolefin polymer block and an aromatic vinyl polymer block, the triblock copolymer being produced by initiating copolymerization of isoolefin and alkylstyrene which are mixed in advance, adding isoolefin at a midpoint of the polymerization at which midpoint those monomers have been consumed to some extent, and further adding an aromatic vinyl monomer. Note, however, that Patent Literature 5 reports neither a concentration nor an effect of alkylstyrene.

Further, Patent Literature 5 discloses an example of production of a copolymer in which p-methyl styrene is separately added several times during polymerization of isobutylene so as to be randomly introduced into an isobutylene polymer and which has a narrow molecular weight distribution. Note, however, that Patent Literature 5 does not report that the triblock copolymer is produced by polymerizing the aromatic vinyl monomer subsequently to the introduction of p-methyl styrene into the isobutylene polymer.

CITATION LIST

Patent Literatures

[Patent Literature 1]

Japanese Patent Application Publication, Tokukaihei, No. 11-189630 (1999)

[Patent Literature 2]

Japanese Patent Application Publication, Tokukaihei, No. 2-150408 (1990)

[Patent Literature 3]

Published Japanese Translation of PCT International Application, Tokuhyo, No. 2000-504358

[Patent Literature 4]

Published Japanese Translation of PCT International Application, Tokuhyo, No. 2013-527304

[Patent Literature 5]

Published Japanese Translation of PCT International Application, Tokuhyo, No. 2002-534543

SUMMARY

A block copolymer that is obtained by synthesizing a middle block by addition of an isoolefin monomer in the middle of copolymerization of the isoolefin monomer and alkylstyrene and subsequently synthesizing a both end block by further polymerization of an aromatic vinyl monomer with the middle block thus synthesized makes it possible to maintain an excellent mechanical strength of a thermoplastic elastomer (Patent Literature 5). Note, however, that in order to be added in the middle of the polymerization, the isoolefin monomer, which is typified by isobutylene and has a low boiling point, needs to be dissolved in advance in a solvent that is cooled at a low temperature. This requires a storage tank provided with a freezing machine and consequently requires large scale equipment. Further, living cationic polymerization is carried out under a condition of an ultra low temperature of approximately −90° C. to −70° C. This makes it necessary to also maintain, at an ultra low temperature, a tank in which to store the isoolefin monomer for the addition, so that not only an issue of equipment but also an issue of utility cost arises. In addition, a polymer structure changes depending on a monomer conversion ratio during the addition of the isoolefin monomer. This also causes a difficulty in stable production of a polymer.

Alkylstyrene which is separately shot-added several times during polymerization can be randomly introduced into an isoolefin polymer (Patent Literature 5). Note, however, that a block copolymer that is obtained by polymerizing, subsequently to the introduction of alkylstyrene into the isoolefin polymer, an aromatic vinyl monomer with both ends of the isoolefin polymer into which alkylstyrene has been randomly introduced has a lower mechanical property such as a tensile strength.

Further, a thermoplastic elastomer that is halogenated by introducing thereinto halogen does not exhibit adhesion in a case where a halogen group is introduced into aromatic blocks located at ends of the block copolymer, whereas the thermoplastic elastomer is less heat-resistant in a case where a halogen group is introduced into an isobutylene block. This unfortunately makes it impossible for a thermoplastic elastomer to have both adhesion and heat resistance.

A method in accordance with one or more embodiments of the present invention for producing a thermoplastic elastomer, the thermoplastic elastomer including: a block (a) (or "first block") containing a C4-C7 isoolefin monomer (A) and alkylstyrene (B) as main components; and a block (b) (or "second block") containing an aromatic vinyl monomer (C) as a main component, the alkylstyrene (B) being represented by the following general formula (1):

[Chem. 1]

(1)

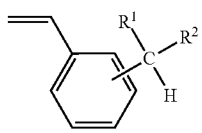

wherein $R^1$ and $R^2$ are each selected from the group consisting of a hydrogen atom, a halogen atom, a C1-C5 monovalent alkyl group, and a C1-C5 halogenated alkyl group; and $R^1$ and $R^2$ may be identical or different, the method includes the steps of: using a compound as a polymerization initiator; and maintaining an amount of substance of an unreacted portion of the alkylstyrene (B) during polymerization of the block (a) at a molar ratio of not more than 1/90 relative to a total amount of substance of the isoolefin monomer (A), the compound being represented by the following general formula (2):

[Chem. 2]

(2)

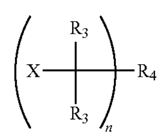

wherein $R^3$s may be identical or different, and each represent a hydrogen atom or a C1-C6 monovalent hydrocarbon group; $R^4$ represents a monovalent or polyvalent aromatic hydrocarbon group, or a monovalent or polyvalent aliphatic hydrocarbon group; X represents a halogen atom, a C1-C6 alkoxyl group, or a C1-C6 acyloxy group; n represents an integer of 1 to 6; and X may be identical or different where X is plural.

The method in accordance with one or more embodiments of the present invention is arranged such that $R^1$ and $R^2$ in the general formula (1) may be identical or different, and are each a hydrogen atom or a C1-C5 alkyl group.

The method in accordance with one or more embodiments of the present invention is arranged such that an amount of substance of the alkylstyrene (B) represented by the general formula (1) is at a molar ratio in a range of 1 to 100 relative to an amount of substance of the polymerization initiator represented by the general formula (2).

The method in accordance with one or more embodiments of the present invention is arranged such that the thermoplastic elastomer has a triblock structure in which the block (a) is a middle block and the block (b) is a both end block.

The method in accordance with one or more embodiments of the present invention is arranged such that the C4-C7 isoolefin monomer (A) is isobutylene.

The method in accordance with one or more embodiments of the present invention is arranged such that the alkylstyrene (B) is p-methyl styrene, and the aromatic vinyl monomer (C) is styrene.

The method in accordance with one or more embodiments of the present invention is arranged such that the block (a) is a polymer block in which a unit derived from the C4-C7 isoolefin monomer (A) and a unit derived from the alkylstyrene (B) are randomly connected.

The method in accordance with one or more embodiments of the present invention is arranged such that a block-structured polymer including the block (a) and the block (b) has a weight average molecular weight of 5,000 to 1,000,000.

The method in accordance with one or more embodiments of the present invention is arranged such that a weight average molecular weight of the block (a) accounts for 60% to 95% of a weight average molecular weight of a block-structured polymer as a whole.

The method in accordance with one or more embodiments of the present invention is arranged such that the block (a) has a molecular weight distribution of not more than 1.7.

The method in accordance with one or more embodiments of the present invention is arranged such that not less than 10% of a total time of polymerization of the block (a) is spent in drip-feeding the alkylstyrene (B).

The method in accordance with one or more embodiments of the present invention is arranged to further include the step of: introducing a halogen group into the thermoplastic elastomer.

The method in accordance with one or more embodiments of the present invention is arranged to further include the step of: introducing a functional group other than the halogen group by reacting the halogen group of the thermoplastic elastomer with a functionalizing agent.

A thermoplastic elastomer in accordance with one or more embodiments of the present invention is obtainable by a method mentioned above.

A thermoplastic elastomer in accordance with one or more embodiments of the present invention may include: a block (a) containing an isobutylene-derived unit and at least one halogen group-containing unit as main components; and a block (b) containing a styrene-derived unit as a main component, the at least one halogen group-containing unit being represented by the following general formula (3):

[Chem. 3]

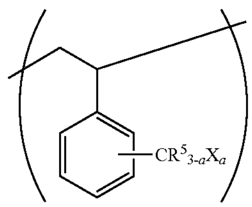

(3)

wherein $R^5$ represents a hydrogen atom or a C1-C5 alkyl group, and may be identical or different where $R^5$ is plural; X represents a halogen atom; and a represents an integer of 1 to 3, the thermoplastic elastomer containing, as a main component, a triblock structure in which the block (a) is a middle block and the block (b) is a both end block, the thermoplastic elastomer having, in one molecule thereof, 12 to 45 halogen group-containing units of the at least one halogen group-containing unit, and the thermoplastic elastomer having a number average molecular weight of 70,000 to 200,000.

One or more embodiments of the present invention makes it possible to more cheaply and more stably produce, by simple equipment, a styrene thermoplastic elastomer in which an alkylstyrene-derived unit is randomly introduced into an isoolefin polymer and which has a high mechanical property. One or more embodiments of the present invention also makes it possible to introduce various functional groups such as halogen into an alkyl group of the alkylstyrene-derived unit which is randomly introduced into the isoolefin polymer of this polymer, and consequently to produce a styrene thermoplastic elastomer which has those functional groups and thus has not only excellent adhesion and excellent heat resistance but also a high mechanical property.

DESCRIPTION OF EMBODIMENTS

The description below deals with embodiments of the present invention. Note, however, that the present invention is not limited to the description of the arrangements below but may be altered in various ways within the scope of the claims. Any embodiment or example based on a proper combination of technical means disclosed in different embodiments and examples is also encompassed in the technical scope of the present invention. All academic and patent literatures listed herein are incorporated herein by reference. Unless otherwise specified herein, any numerical range expressed as "A to B" means "not less than A (A or more) and not more than B (B or less)".

An "amount of substance" herein means an amount of substance which amount is expressed in units of mol.

A "unit" herein means a building block that is included in a polymer and derived from a monomer used to synthesize the polymer. "The number of units" means the number of units (mentioned above) included in one molecule of the polymer.

A "mechanical property" herein may also be referred to as a "dynamic property" and encompasses a strength and plasticity. A strength is evaluated from a "breaking strength: Tb" (i.e., a tensile strength), and plasticity is evaluated from a "breaking elongation: Eb". Note that it will be described in Examples how Tb and Eb are defined and measured.

A method in accordance with one or more embodiments of the present invention for producing a thermoplastic elastomer, the thermoplastic elastomer including: a block (a) containing a C4-C7 isoolefin monomer (A) and alkylstyrene (B) as main components; and a block (b) containing an aromatic vinyl monomer (C) as a main component, the alkylstyrene (B) being represented by the following general formula (1):

[Chem. 4]

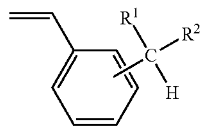

(1)

wherein $R^1$ and $R^2$ are each selected from the group consisting of a hydrogen atom, a halogen atom, a C1-C5 alkyl group, and an alkyl group or a C1-C5 halogenated alkyl group; and $R^1$ and $R^2$ may be identical or different, the method includes the steps of: using a compound as a polymerization initiator; and maintaining an amount of substance of an unreacted portion of the alkylstyrene (B) during polymerization of the block (a) at a molar ratio of not more than 1/90 relative to a total amount of substance of the isoolefin monomer (A), the compound being represented by the following general formula (2):

[Chem. 5]

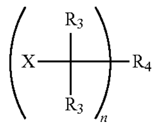

(2)

wherein $R^3$s may be identical or different, and each represent a hydrogen atom or a C1-C6 monovalent hydrocarbon group; $R^4$ represents a monovalent or polyvalent aromatic hydrocarbon group, or a monovalent or polyvalent aliphatic hydrocarbon group; X represents a halogen atom, a C1-C6 alkoxyl group, or a C1-C6 acyloxy group; n represents an integer of 1 to 6; and X may be identical or different where X is plural.

<<Monomer>>

<Isoolefin Monomer (A)>

The isoolefin monomer (A) is not particularly limited provided that the isoolefin monomer (A) is a C4-C7 isoolefin compound. The isoolefin monomer (A) is more specifically exemplified by isobutylene (isobutene), 2-methyl-1-butene, 3-methyl-1-butene, 2-methyl-2-butene, 1-butene, 2-butene, methylvinyl ether, indene, vinyl trimethylsilane, hexene, and 4-methyl-1-pentene. These compounds may be used alone or in combination of two or more kinds. In particular, a monomer of isobutylene may be practically more preferable because such a monomer allows a produced thermoplastic elastomer to have an excellent gas barrier property and an excellent hygroscopic moisture barrier property.

<Alkylstyrene (B)>

The alkylstyrene (B) is a compound represented by the following general formula (1):

[Chem. 6]

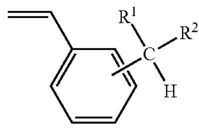

(1)

wherein $R^1$ and $R^2$ are each selected from the group consisting of a hydrogen atom, a halogen atom, a C1-C5 alkyl group, and a C1-C5 halogenated alkyl group; and $R^1$ and $R^2$ may be identical or different. Note that the halogen atom herein encompasses a fluorine atom, a chlorine atom, a bromine atom, and an iodine atom.

In one or more embodiments, $R^1$ and $R^2$ are each a hydrogen atom or a C1-C5 alkyl group from the viewpoint of an influence on a polymerization reaction. In this case, $R^1$ and $R^2$ may be identical or different.

As the alkylstyrene (B), among compounds each represented by the general formula (1), o-methyl styrene, o-methyl fluoride styrene, o-chloromethyl styrene, o-bromomethyl styrene, m-methyl styrene, m-methyl fluoride styrene, m-chloromethyl styrene, m-bromomethyl styrene, p-methyl styrene, p-methyl fluoride styrene, p-chloromethyl styrene, and p-bromomethyl styrene may be more preferable in terms of reactivity, p-methyl styrene and p-chloromethyl styrene may be still more preferable in terms of availability and polymerization reactivity, and p-methyl styrene may be particularly preferable.

<Aromatic Vinyl Monomer (C)>

Examples of the aromatic vinyl monomer (C) include styrene, o-, m-, or p-methyl styrene, α-methyl styrene, β-methyl styrene, 2,6-dimethyl styrene, 2,4-dimethyl styrene, α-methyl-o-methyl styrene, α-methyl-m-methyl styrene, α-methyl-p-methyl styrene, β-methyl-o-methyl styrene, β-methyl-m-methyl styrene, β-methyl-p-methyl styrene, 2,4,6-trimethyl styrene, α-methyl-2,6-dimethyl styrene, α-methyl-2,4-dimethyl styrene, 3-methyl-2,6-dimethyl styrene, β-methyl-2,4-dimethyl styrene, o-, m-, or p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-, m-, or p-t-butylstyrene, o-, m-, or p-methoxystyrene, o-, m-, or p-chloromethyl styrene, o-, m-, or p-bromomethyl styrene, a styrene derivative into which a silyl group is introduced by substitution, indene, vinylnaphthalene, and the like. These compounds may be used alone or in combination. In particular, styrene, p-methyl styrene, α-methyl styrene, or indene, or a mixture of two or more kinds of these compounds may be more preferable in terms of industrial availability, a price, and/or a glass transition temperature, and styrene may be still more preferable particularly in terms of its favorable availability.

<<Polymerization Initiator>>

The polymerization initiator used in one or more embodiments of the present invention is a compound represented by the following general formula (2):

[Chem. 7]

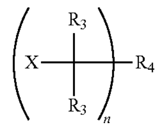

(2)

wherein $R^3$s may be identical or different, and each represent a hydrogen atom or a C1-C6 monovalent hydrocarbon group; $R^4$ represents a monovalent or polyvalent aromatic hydrocarbon group, or a monovalent or polyvalent aliphatic hydrocarbon group; X represents a halogen atom, a C1-C6 alkoxyl group, or a C1-C6 acyloxy group; n represents an integer of 1 to 6; and X may be identical or different where X is plural.

The polymerization initiator generates carbocation in the presence of, for example, a Lewis acid and is considered to serve as a starting point of cationic polymerization.

Examples of the compound used in one or more embodiments of the present invention and represented by the general formula (2) include the following compounds: (1-chlor-1-methylethyl)benzene[$C_6H_5C(CH_3)_2Cl$], 1,4-bis(1-chlor-1-methylethyl)benzene[$1,4\text{-}Cl(CH_3)_2CC_6H_4C(CH_3)_2Cl$], 1,3-bis(1-chlor-1-methylethyl)benzene[$1,3\text{-}Cl(CH_3)_2CC_6H_4C(CH_3)_2Cl$], 1,3,5-tris(1-chlor-1-methlyethyl)benzene[$1,2,5\text{-}(ClC(CH_3)_2)_3C_6H_3$], and 1,3-bis(1-chlor-1-methylethyl)-5-(tert-butyl)benzene[$1,3\text{-}(C(CH_3)_2Cl)_2\text{-}5\text{-}(C(CH_3)_3)C_6H_3$].

In one or more embodiments, compounds that are more preferable among the above compounds are 1-chlor-1-methylethylbenzene[$C_6H_5C(CH_3)_2Cl$], bis(1-chlor-1-methylethyl)benzene[$C_6H_4(C(CH_3)_2Cl)_2$], and tris(1-chlor-1-methylethyl)benzene[$(ClC(CH_3)_2)_3C_6H_3$]. Note that 1-chlor-1-methylethylbenzene is also referred to as α-chloroisopropylbenzene, 2-chloro-2-propylbenzene, or cumyl chloride. Bis(1-chlor-1-methylethyl)benzene is also referred to as bis(α-chloroisopropyl)benzene, bis(2-chloro-2-propyl)benzene, or dicumyl chloride. Tris(1-chlor-1-methylethyl)benzene is also referred to as tris(α-chloroisopropyl)benzene, tris(2-chloro-2-propyl)benzene, or tricumyl chloride.

<<Block>>

<Block (a) (or "First Block")>

The block (a) only needs to be a polymer block that contains the isoolefin monomer (A) and the alkylstyrene (B) as main components. Note here that "contain . . . as main components" means that a total weight of a unit derived from the isoolefin monomer (A) and a unit derived from the alkylstyrene (B) may account for not less than 60% by weight, or not less than 80% by weight, or not less than 90% by weight, of a gross weight of the block (a). Given that a resultant copolymer, i.e., a thermoplastic elastomer to be finally obtained has an excellent dynamic property as an elastomer, the block (a) may be arranged such that the unit derived from the isoolefin monomer (A) accounts for not less than 60% by weight, or not less than 80% by weight, of the gross weight of the block (a).

Further, given that a resultant copolymer, i.e., a thermoplastic elastomer to be finally obtained has an excellent dynamic property as an elastomer, the unit derived from the alkylstyrene (B) may be contained at a percentage of 0.1 mol % to 10.0 mol %, or of 0.4 mol % to 3.0 mol %, or of 0.5 mol % to 3.0 mol %, relative to the unit derived from the isoolefin monomer (A). In addition, given that an effect of a functional group of the alkylstyrene (B) is produced, an amount of substance of the unit derived from the alkylstyrene (B) may be at a molar ratio in a range of 1 to 100, or of 10 to 50, or of 15 to 40, relative to an amount of substance of the polymerization initiator represented by the general formula (2). The alkylstyrene (B) whose amount of substance relative to the polymerization initiator falls within the above range may be preferable in terms of polymerization control and allows a thermoplastic elastomer to be finally obtained has a higher dynamic property and higher heat resistance.

The block (a) also encompasses a polymer block that contains, as main components, an isobutylene-derived unit and a halogen group-containing unit represented by the following general formula (3):

[Chem. 8]

(3)

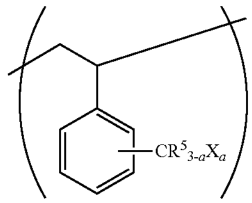

wherein $R^5$ represents a hydrogen atom or a C1-C5 alkyl group, and may be identical or different where $R^5$ is plural; X represents a halogen atom; and a represents an integer of 1 to 3.

Further, the block (a) has, in one molecule thereof, 5 to 60, or 10 to 50, or 12 to 45 halogen group-containing units each represented by the general formula (3).

In addition, assuming that a percentage of the block (a) after halogenation contains, in a total, the isobutylene-derived unit, the alkylstyrene-derived unit, and the halogen group-containing unit represented by the general formula (3) is 100 mol %, the halogen group-containing unit represented by the general formula (3) may be contained, at a percentage (mol %) of 0.2 mol % to 4.0 mol %, or of 0.4 mol % to 3.0 mol %, or of 0.45 mol % to 2.3 mol %, in the block (a) after halogenation. Further, in terms of heat resistance, the halogen group-containing unit represented by the general formula (3) may be contained at a percentage (mol %) of 0.45 mol % to 2.0 mol %, or of 0.45 mol % to 1.4 mol %.

In addition, the block (a) after halogenation has a number average molecular weight that is not particularly limited but may be 5,000 to 1,000,000, or 50,000 to 500,000, the number average molecular weight being expressed in terms of a polystyrene-reduced molecular weight measured by gel permeation chromatogram. The block (a) after halogenation which block (a) has a number average molecular weight of not less than 5,000 may be preferable because such a block (a) allows sufficient display of a mechanical characteristic of a thermoplastic elastomer to be finally obtained. The block (a) after halogenation which block (a) has a number average molecular weight of not more than 1,000,000 may be preferable because such a block (a) causes no deterioration in flowability, processability, and moldability of a thermoplastic elastomer to be finally obtained and facilitates handling during production of a thermoplastic elastomer to be finally obtained. In terms of heat resistance, the block (a) after halogenation may have a number average molecular weight of 70,000 to 250,000, or of 90,000 to 200,000.

A method for introducing a halogen group into the block (a) may be exemplified by a method in which monomers each having a halogen group are copolymerized during a polymerization step so that the halogen group is introduced and a method in which monomers each having a functional group into which a halogen group can be introduced are copolymerized and thereafter the functional group is halogenated so that the halogen group is introduced.

In a case where the halogen group is introduced into the functional group after the copolymerization, the monomers each having the functional group into which the halogen group can be introduced are each exemplified by, but not particularly limited to, o-, m-, or p-methyl styrene, o-, m-, or p-ethylstyrene, 2,3-, 2,4-, 2,5-dimethyl styrene, and the like.

The block (a) is also a polymer block in which the isoolefin monomer (A) and the alkylstyrene (B) are randomly connected. "Randomly" herein means that the above two components are connected in no particular order. In ion polymerization in general, components whose electronic states are closer to each other tend to be continuously polymerized. Thus, in a case where two components are mixed, one of the two components is preferentially consumed by polymerization. This causes the two components to be connected so as to be blocked or gradient. As a result, the two components are non-randomly connected. The isoolefin monomer (A) and the alkylstyrene (B) of one or more embodiments of the present invention which are mixed before polymerization is started also unexceptionally form a polymer having a block structure or a gradient structure. This is because the isoolefin monomer (A) and the alkylstyrene (B) differ in reactivity due to their different electronic states. Specifically, in the case of, for example, a combination of isobutylene and p-methyl styrene, since p-methyl styrene has higher polymerization reactivity and is consumed earlier, the combination of isobutylene and p-methyl styrene forms a polymer having a gradient structure. Thus, one of the two components which one has higher reactivity may continue to be added so as not to be completely consumed. According to one or more embodiments of the present invention, in a case where the block (a) is produced by dripping the alkylstyrene (B) in small portions while causing the alkylstyrene (B), which is a component having higher reactivity, to have a lower amount of substance than the isoolefin monomer (A), it is possible to obtain the block (a), which is a polymer block in which the isoolefin monomer (A) and the alkylstyrene (B) are randomly connected.

According to one or more embodiments of the present invention, an amount of substance of an unreacted portion of the alkylstyrene (B) during polymerization of the block (a) is maintained at a molar ratio of not more than 1/90 relative to a total amount of substance of the isoolefin monomer (A). This ratio may be maintained at not more than 1/100, or at not more than 1/120. The alkylstyrene (B) which has an amount of substance which amount is maintained at a molar ratio of not more than 1/90 relative to a total amount of substance of the isoolefin monomer (A) may be preferable because such alkylstyrene (B) prevents a reduction in mechanical strength and/or a deterioration in function of a functional group from occurring in a thermoplastic elastomer to be finally obtained. According to one or more embodiments of the present invention, a method for maintaining the amount of substance of the unreacted portion of the alkylstyrene (B) during polymerization of the block (a) at a molar ratio in the above range, is exemplified by a method in which the alkylstyrene (B) is dripped onto the isoolefin monomer (A) in small portions, the amount of substance of the unreacted portion of the alkylstyrene (B) in a reaction solution that is being polymerized is monitored at any time, and the amount of substance of the unreacted portion of the alkylstyrene (B) is maintained at a concentration, which is not more than a given concentration, relative to the total amount of substance of the isoolefin monomer (A). Further, a method in which the amount of substance of the unreacted portion of the alkylstyrene (B) in a reaction solution that is being polymerized is monitored at any time is exemplified by, but not particularly limited to, a method in which the alkylstyrene (B) is dripped in small portions, the reaction solution that is being polymerized is extracted at any time, and the amount of substance of the unreacted portion of the alkylstyrene (B) is measured by a method such as gas chromatography or NMR.

According to one or more embodiments of the present invention, in order to maintain the amount of substance of the unreacted portion of the alkylstyrene (B) during polymerization of the block (a) at a molar ratio in the above range, it may be preferable not to add the alkylstyrene (B) to the isoolefin monomer (A) before polymerization is started. Further, in order to maintain the amount of substance of the unreacted portion of the alkylstyrene (B) during polymerization of the block (a) at a molar ratio in the above range, it may be preferable that addition of the isoolefin monomer (A) be finished before addition of the alkylstyrene (B) is finished, and it may be more preferable that a whole amount of the isoolefin monomer (A) be added before polymerization is started.

According to the production method (described earlier), a method for dripping the alkylstyrene (B) is exemplified by a continuous introduction method in which a feed pump or the like is used, a shot introduction method in which the alkylstyrene (B) is fed at regular intervals, and other methods. According to the shot introduction method, the alkylstyrene (B) easily has a locally high concentration in a system. This makes it difficult to control the concentration of the alkylstyrene (B) so that the alkylstyrene (B) has a concentration that falls within the range of concentration (described earlier), so that the shot introduction method may be unpreferable. In one or more embodiments, the alkylstyrene (B) may be introduced as continuously as possible. Further, in order that a unit derived from the alkylstyrene (B) is uniformly dispersed in the block (a), the alkylstyrene (B) may be drip-fed by use of not less than 10%, or not less than 20%, or not less than 25%, of a total time of polymerization of the block (a). In a case where the alkylstyrene (B) is drip-fed by use of not less than 10% of the total time of polymerization of the block (a), the block (a) is produced in a form of a polymer in which units each derived from the alkylstyrene (B) are randomly arranged without being arranged so as to be gradient. This (i) allows a thermoplastic elastomer to be finally produced to have an excellent dynamic property and (ii) does not change a desired function (e.g., adhesion) that is carried out by a functional group derived from the alkylstyrene (B). It may be possible that the alkylstyrene (B) be drip-fed by use of not less than 10% of the total time of polymerization of the block (a).

Into alkyl groups of alkylstyrene which alkyl groups are randomly present in the block (a), a functional group may be introduced after polymerization. Specifically, the alkyl groups can be halogenated as in Patent Literature 2. Further, into a halogenated alkyl group obtained by halogenation, various functional groups including an acryloyl group may be introduced by a nucleophilic reaction as in Patent Literature 3. A functional group to be introduced is exemplified by, but not particularly limited in kind to, an alkenyl group (—C═C—), an alkynyl group (—C≡C), a halogen group (—F, —Cl, —Br, —I), a hydroxy group (—OH), an amino group (—N—), an imino group (═N—), an N-oxide group (—N→O), an N-hydroxy group (—N—OH), a nitro group ($—NO_2$), a nitroso group (—NO), an azo group (—N═N—), a diazo group ($—N^+≡N$), an azide group ($—N_3$), an oxy group (—O—), an oxo group (═O), a carbonyl group (—CO—), a phenyl group, a phosphino group, a thio group (—S—), an S-oxide group (S→O), a thioxy group (═S), and the like. In a case where polar groups such as the halogen group and the carbonyl group are introduced into an isoolefin polymer that is less adhesive due to its low polarity, the isoolefin polymer can be provided with adhesion to various substances. Thus, such polar groups may be more preferable. Further, an isoolefin polymer block, which has low Tg in a thermoplastic elastomer and has plasticity at a room temperature, easily interacts with another substance at an interface between the isoolefin polymer block and the another substance in a case where the isoolefin polymer block contacts the another substance. Thus, for example, in a case where functional groups each being a polar group such as a halogen group or a carbonyl group are randomly arranged, a thermoplastic elastomer to be finally produced more effectively carries out a function of adhesion to another substance, so that the functional groups may be randomly introduced into the block (a). From the viewpoint of synthesis, a halogen group, which can be easily introduced into an alkyl group of alkylstyrene, may be preferable. By introducing a functional group into a first polymer, it is possible to form a second polymer into which a functional group is introduced. Into the first polymer into which a functional group is introduced, a functional group has already been introduced. As a result, the first polymer is an intermediate. In particular, given that a nucleophilic reagent can be easily substituted for a halogen group and consequently various functional groups can also be substituted for the halogen group which is introduced into an alkyl group of alkylstyrene, the halogen group may be introduced as an intermediate. Further, among the halogen groups (listed above), bromine may be more preferable from the viewpoint of nucleophilic reactivity, substance stability, and adhesion.

The block (a) may have a molecular weight distribution of not more than 1.7, or of not more than 1.5, or of not more than 1.4, or of 1.25. The block (a) which has a molecular weight distribution of not more than 1.7 may be preferable because such a block (a) (i) allows a side reaction to occur during polymerization at a low rate and (ii) allows the aromatic vinyl monomer (C) to be subsequently sufficiently subjected to polymerization starting from a polymer end.

<Block (b) (or "Second Block")>

The block (b) only needs to be a polymer block that contains the aromatic vinyl monomer (C) as a main component. Note here that "contain as a main component" means that a total weight of units each derived from the aromatic vinyl monomer (C) may account for not less than 60% by weight, or not less than 80% by weight, or not less than 90% by weight, of a gross weight of the block (b). Given that a thermoplastic elastomer to be finally obtained has an excellent dynamic property as an elastomer, the block (b) may be a polymer block in which the units each derived from the aromatic vinyl monomer (C) may account for not less than 60% by weight, and not less than 80% by weight, of a gross weight of the block (b).

<<Block-Structured Polymer>>

A thermoplastic elastomer that is produced in one or more embodiments of the present invention is a block-structured polymer. The block-structured polymer which is produced in one or more embodiments of the present invention includes a polymer block (a) that contains the isoolefin monomer (A) and the alkylstyrene (B) as main components and a polymer block (b) that contains the aromatic vinyl monomer (C) as a main component.

According to the block-structured polymer, a structure that is formed by these two types of blocks may be a diblock structure such as (a)-(b), a triblock structure such as (b)-(a)-(b), or a star block structure such as (a)-(b)m (m represents an integer of 3 to 20), or a mixture of these structures. Given that a thermoplastic elastomer to be finally obtained has an excellent dynamic property as an elastomer, the block-structured polymer may singly contain a triblock structure contains the triblock structure as a main component, or singly a star block structure or contains the star block structure as a main component. In terms of availability of an initiator, the block-structured polymer may singly contain a triblock structure or contains the triblock structure as a main component. That is, it may be preferable that the thermoplastic elastomer have a triblock structure in which the block (a) is a middle block and the block (b) is a both end block, or contain such a triblock structure as a main component. Note here that "contain . . . as a main component" means that a weight of a corresponding block structure may account for not less than 60% by weight, or not less than 80% by weight, of a weight of the block-structured polymer as a whole.

Note that though the block-structured polymer may contain at least one of (i) a polymer consisting only of the block (a) and (ii) a polymer consisting only of the block (b), the polymers (i) and (ii) may be contained in a smaller amount from the viewpoint of a dynamic property of a resultant thermoplastic elastomer.

In terms of dynamic properties such as a strength and plasticity, a composition ratio between the block (a) and the block (b) may be (a)/(b)=60 to 95/5 to 40, or (a)/(b)=70 to 90/10 to 30, the composition ratio being expressed in terms of a weight ratio. In a case where the composition ratio of (b) to (a) falls within the above range, the block-structured polymer is easily molded due to its not too high hardness, and plasticity as an elastomer of the block-structured polymer is not lost. Thus, the composition ratio of (b) to (a) which composition ratio falls within the above range may be preferable. Meanwhile, in a case where the composition ratio of (a) to (b) falls within the above range, the block-structured polymer is highly moldable due to its less strong tack at a normal temperature, and a mechanical strength as an elastomer of the block-structured polymer is not lost. Thus, the composition ratio of (a) to (b) which composition ratio falls within the above range may be preferable.

The block-structured polymer, i.e., the thermoplastic elastomer of one or more embodiments of the present invention has a weight average molecular weight that is not particularly limited but may be 5,000 to 1,000,000, or 50,000 to 500,000, the weight average molecular weight being expressed in terms of a polystyrene-reduced molecular weight measured by gel permeation chromatogram. The block-structured polymer which has a weight average molecular weight of not less than 5,000 may be preferable because such a block-structured polymer allows a mechanical characteristic of the thermoplastic elastomer of one or more embodiments of the present invention to be sufficiently displayed and is excellent in performance as an elastomer material. The block-structured polymer which has a weight average molecular weight of not more than 1,000,000 may be preferable because such a block-structured polymer causes no deterioration in flowability, processability, and moldability of the thermoplastic elastomer of one or more embodiments of the present invention and facilitates handling during production of the thermoplastic elastomer of one or more embodiments of the present invention.

In terms of heat resistance, the block-structured polymer may have a weight average molecular weight of 100,000 to 250,000, or of 150,000 to 220,000.

Further, a weight average molecular weight of the block (a) may account for 60% to 95%, or 70% to 93%, or 87% to 92%, of a weight average molecular weight of the block-structured polymer as a whole.

The block-structured polymer, i.e., the thermoplastic elastomer of one or more embodiments of the present invention has a number average molecular weight that is not particularly limited but may be 5,000 to 1,000,000, or 50,000 to 500,000, the number average molecular weight being expressed in terms of a polystyrene-reduced molecular weight measured by gel permeation chromatogram. The block-structured polymer which has a number average molecular weight of not less than 5,000 may be preferable because such a block-structured polymer allows a mechanical characteristic of the thermoplastic elastomer of one or more embodiments of the present invention to be sufficiently displayed and is excellent in performance as an elastomer material. The block-structured polymer which has a number average molecular weight of not more than 1,000,000 may be preferable because such a block-structured polymer causes no deterioration in flowability, processability, and moldability of the thermoplastic elastomer of one or more embodiments of the present invention and facilitates handling during production of the thermoplastic elastomer of one or more embodiments of the present invention. In terms of heat resistance, the block-structured polymer may be a number average molecular weight of 70,000 to 200,000, of 90,000 to 200,000.

The block-structured polymer, i.e., the thermoplastic elastomer of one or more embodiments of the present invention may have a molecular weight distribution (a numerical value expressed in terms of a ratio between a weight average molecular weight $M_w$ and a number average molecular weight $M_n$ ($M_w/M_n$)) of 1.0 to 3.0, or of 1.0 to 2.0. The block-structured polymer which has a molecular weight distribution of not more than 3.0 is highly uniform in molecular weight and has neither too low viscosity nor too high viscosity in its molten state. Thus, the block-structured polymer which has a molecular weight distribution of not more than 3.0 may be preferable in terms of processing stability and due to its excellent workability. For this reason, in particular, the block-structured polymer which has a molecular weight distribution of not more than 2.0 may be more preferable because such a block-structured polymer allows a melt viscosity of a resin to be lower.

The block-structured polymer is not particularly limited provided that the block-structured polymer includes the block (a) and the block (b), which are described earlier. In one or more embodiments, examples of the block-structured polymer include a thermoplastic elastomer including: a block (a) containing an isobutylene-derived unit and a halogen group-containing unit as main components; and a block (b) containing a styrene-derived unit as a main component, the halogen group-containing unit being represented by the following general formula (3):

[Chem. 9]

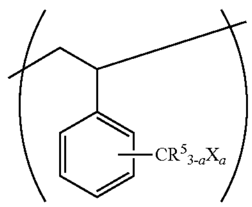

(3)

wherein $R^5$ represents a hydrogen atom or a C1-C5 alkyl group, and may be identical or different where $R^5$ is plural; X represents a halogen atom; and a represents an integer of 1 to 3, the thermoplastic elastomer containing, as a main component, a triblock structure in which the block (a) is a middle block and the block (b) is a both end block.

The thermoplastic elastomer may have, in one molecule thereof, 5 to 60, or 10 to 50, or 12 to 45 halogen group-containing units each represented by the general formula (3). The thermoplastic elastomer which has not less than 5 halogen group-containing units in one molecule thereof may be preferable because such a thermoplastic elastomer allows a resultant thermoplastic elastomer to be highly adhesive. The thermoplastic elastomer which has not more than 60 halogen group-containing units in one molecule thereof may be preferable because such a thermoplastic elastomer allows a resultant thermoplastic elastomer to have excellent heat resistance.

In addition, assuming that a percentage at which the thermoplastic elastomer contains, in a total, the isobutylene-derived unit, the alkylstyrene-derived unit, and the halogen group-containing unit represented by the general formula (3) is 100 mol %, the halogen group-containing unit represented by the general formula (3) may be contained, at a percentage (mol %) of 0.2 mol % to 4.0 mol %, or of 0.4 mol % to 3.0 mol %, or of 0.45 mol % to 2.3 mol %, in the thermoplastic elastomer after halogenation. Further, in terms of heat resistance, the halogen group-containing unit represented by the general formula (3) is contained at a percentage (mol %) of 0.45 mol % to 2.0 mol %, or of 0.45 mol % to 1.4 mol %.

In addition, the thermoplastic elastomer after halogenation has a number average molecular weight that is not particularly limited but may be 5,000 to 1,000,000, or 50,000 to 500,000, the number average molecular weight being expressed in terms of a polystyrene-reduced molecular weight measured by gel permeation chromatogram. The thermoplastic elastomer after halogenation which thermoplastic elastomer has a number average molecular weight of not less than 5,000 may be preferable because such a thermoplastic elastomer allows a mechanical characteristic of such a thermoplastic elastomer to be sufficiently displayed and is excellent in performance as an elastomer material. The thermoplastic elastomer after halogenation which thermoplastic elastomer has a number average molecular weight of not more than 1,000,000 may be preferable because such a thermoplastic elastomer causes no deterioration in flowability, processability, and moldability of such a thermoplastic elastomer and facilitates handling during production of such a thermoplastic elastomer. In terms of heat resistance, the thermoplastic elastomer after halogenation may have a number average molecular weight of 70,000 to 200,000, or of 90,000 to 200,000.

In particular, from the viewpoint of excellence particularly in both adhesion and heat resistance of the thermoplastic elastomer after halogenation, it may be particularly preferable (i) that the thermoplastic elastomer have 12 to 45 halogen group-containing units in one molecule thereof and (ii) that the thermoplastic elastomer have a number average molecular weight of 92,000 to 200,000.

Halogen group-containing units which are present in the block (a) randomly with respect to the isobutylene-derived unit may be preferable so that the thermoplastic elastomer after halogenation exhibits adhesion. Meanwhile, halogen group-containing units which are present in the block (b), or halogen group-containing units which are present in a polymer so as to be continuous or dense may be unpreferable so that the thermoplastic elastomer after halogenation is less adhesive.

Into the thermoplastic elastomer of one or more embodiments of the present invention, a functional group may be introduced and is not particularly limited in kind. Examples of such a functional group include an alkenyl group (—C═C—), an alkynyl group (—C≡C), a halogen group (—F, —Cl, —Br, —I), a hydroxy group (—OH), an amino group (—N—), an imino group (═N—), an N-oxide group (—N→O), an N-hydroxy group (—N—OH), a nitro group (—$NO_2$), a nitroso group (—NO), an azo group (—N═N—), a diazo group (—N+EN), an azide group (—$N_3$), an oxy group (—O—), an oxo group (═O), a carbonyl group (—CO—), a phenyl group, a phosphino group, a thio group (—S—), an S-oxide group (S→O), a thioxy group (═S), and the like. In particular, a halogen group, which can be easily introduced into an alkyl group of alkylstyrene, may be preferable. By introducing a functional group into a first polymer, it is possible to form a second polymer into which a functional group is introduced. Into the first polymer into which a functional group is introduced, a functional group has already been introduced. As a result, the first polymer is an intermediate. In particular, given that a nucleophilic reagent can be easily substituted for a halogen group and consequently various functional groups can also be substituted for the halogen group which is introduced into an alkyl group of alkylstyrene, the halogen group may also be preferably introduced as an intermediate.

<<Production Method>>

As described earlier, the thermoplastic elastomer of one or more embodiments of the present invention is produced by (i) forming the block (a) by polymerizing the isoolefin monomer (A) and the alkylstyrene (B) by continuously dripping the alkylstyrene (B) into the isoolefin monomer (A) while maintaining a concentration of an unreacted portion of the alkylstyrene (B) in a polymerization solution at a concentration which is not more than a given concentration, and (ii) subsequently forming the block (b) by polymerizing the aromatic vinyl monomer.

<Polymerization Method>

A polymerization method of one or more embodiments of the present invention is a cationic polymerization method in which carbocation is a growth species.

The polymerization initiator is a compound represented by the following general formula (2):

[Chem. 10]

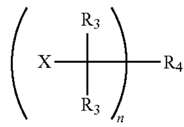

(2)

wherein $R^3$s may be identical or different, and each represent a hydrogen atom or a C1-C6 monovalent hydrocarbon group; $R^4$ represents a monovalent or polyvalent aromatic hydrocarbon group, or a monovalent or polyvalent aliphatic hydrocarbon group; X represents a halogen atom, a C1-C6 alkoxyl group, or a C1-C6 acyloxy group; n represents an integer of 1 to 6; and X may be identical or different where X is plural.

The polymerization initiator generates carbocation in the presence of, for example, a Lewis acid, and is considered to serve as a starting point of cationic polymerization.

In the polymerization reaction, a Lewis acid catalyst can further coexist. Such a Lewis acid catalyst is not particularly limited provided that the Lewis acid catalyst can be used in the cationic polymerization. Examples of the Lewis acid catalyst include metallic halides such as $TiCl_4$, $TiBr_4$, $BCl_3$, $BF_3$, $BF_3$-$OEt_2$, $SnCl_4$, $SbC_{15}$, $SbF_5$, $WCl_6$, $TaCl_6$, $VCl_5$, $FeCl_3$, $FeBr_3$, $ZnCl_2$, $ZnBr_2$, $AlCl_3$, and $AlBr_3$; metallic compounds having both a halogen atom and an alkoxide group on metals such as $TiCl_3(OiPr)$, $TiCl_2(OiPr)_2$, and $TiCl(OiPr)_3$; organic metallic halides such as $Et_2AlCl$, $EtAlCl_2$, $Me_2AlCl$, and $MeAlCl_2$; and the like. Note that the above Lewis acid catalysts can be used alone or in combination of two or more kinds.

In particular, in view of a capability as a catalyst and easiness of industrial availability, $TiCl_4$, $BCl_3$, or $SnCl_4$ may be preferably used as the Lewis acid catalyst. An amount of the Lewis acid catalyst used is not particularly limited and can be optionally set in view of, for example, a polymerization characteristic of and a polymerization concentration of a monomer to be used, a desired polymerization time, and an exothermal behavior in a system. The Lewis acid catalyst may be used at a molar ratio in a range of 0.1 to 200, or of 0.2 to 100, relative to the initiator represented by the general formula (2).

In the polymerization reaction, an electron donor component can further coexist according to need. The electron donor component, which is considered to yield an effect of stabilizing a carbon cation at a growth terminal in cationic polymerization, makes it possible to obtain a polymer which has a narrow molecular weight distribution and whose structure is controlled. The electron donor component is exemplified by, but not particularly limited to, a pyridine, an amine, an amide, a sulfoxide, an ester, a metallic compound having an oxygen atom bonded to a metallic atom, and the like.

As the electron donor component, it is possible to use any of various compounds whose donor number is 15 to 60, the donor number being defined as a parameter indicative of a strength as an electron donor. Such an electron donor component is normally specifically exemplified by 2,6-di-t-butylpyridine, 2-t-butylpyridine, 2,4,6-trimethylpyridine, 2,6-dimethylpyridine, 2-methylpyridine, pyridine, diethylamine, trimethylamine, triethylamine, tributylamine, N,N-dimethylaniline, N,N-dimethylformamide, N,N-dimethyacetamide, N,N-diethylacetamide, dimethylsulfoxide, diethylether, methyl acetate, ethyl acetate, trimethyl phosphate, hexamethylphosphoric triamide; titanium alkoxides such as titanium (III) methoxide, titanium (IV) methoxide, titanium (IV) isopropoxide, and titanium (IV) butoxide; aluminium alkoxides such as aluminium triethoxide and aluminium tributoxide; and the like. The electron donor component may be more preferably exemplified by 2,6-di-t-butylpyridine, 2,6-dimethylpyridine, 2-methylpyridine, pyridine, diethylamine, trimethylamine, triethylamine, N,N-dimethylformamide, N,N-dimethylacetamide, dimethylsulfoxide, titanium (IV) isopropoxide, titanium (IV) butoxide, and the like. Donor numbers of the above various electron donor substances are shown in "The donor-acceptor approach to molecular interactions", written by Gutmann, translated by Otaki and Okada, published by Scientific Societies Press (1983). Among these substances, 2-methylpyridine, which has a remarkable addition effect, titanium (IV) isopropoxide, which makes a reaction system uniform, or triethylamine, which is less affected by moisture, may be particularly preferable as the electron donor component. The electron donor components can be used in one kind or in combination of two or more kinds.

The electron donor component may be used at a ratio in a range normally of 0.01 to 100, or of 0.1 to 50, relative to the polymerization initiator.

A polymerization reaction of one or more embodiments of the present invention can be carried out in an organic solvent according to need. Such an organic solvent is not particularly limited provided that the organic solvent is a solvent that is generally used in cationic polymerization. As the organic solvent, it is possible to use a halogenated hydrocarbon-containing solvent, a non-halogen solvent such as an aliphatic hydrocarbon-containing solvent or an aromatic hydrocarbon-containing solvent, or a mixture of these solvents.

The halogenated hydrocarbon is exemplified by, but not particularly limited to, methyl chloride, methylene chloride, chloroethane, dichloroethane, 1-chloropropane, 1-chloro-2-methylpropane, 1-chlorobutane, 1-chloro-2-methylbutane, 1-chloro-3-methylbutane, 1-chloro-2,2-dimethylbutane, 1-chloro-3,3-dimethylbutane, 1-chloro-2,3-dimethylbutane, 1-chloropentane, 1-chloro-2-methylpentane, 1-chloro-3-methylpentane, 1-chloro-4-methylpentane, 1-chlorohexane, 1-chloro-2-methylhexane, 1-chloro-3-methylhexane, 1-chloro-4-methylhexane, 1-chloro-5-methylhexane, 1-chloroheptane, 1-chlorooctane, 2-chloropropane, 2-chlorobutane, 2-chloropentane, 2-chlorohexane, 2-chloroheptane, 2-chlorooctane, chlorobenzene, and the like. These halogenated hydrocarbons can be used in one kind or in combination of two or more kinds. Aliphatic and/or aromatic hydrocarbon(s) that can be used in one or more embodiments of the present invention is exemplified by butane, pentane, hexane, heptane, octane, nonane, decane, 2-methylpropane, 2-methylbutane, 2,3,3-trimethylpentane, 2,2,5-trimethylhexane, cyclohexane, methylcyclohexane, ethylcyclohexane, paraffin oil, benzene, toluene, xylene, ethylbenzene, propylbenzene, butylbenzene, and the like. These aliphatic and/or aromatic hydrocarbons can be used in one kind or in combination of two or more kinds.

In particular, a mixed solvent of C3-C5 mono halogenated hydrocarbon and aliphatic hydrocarbon may be used in terms of solubility of an isobutylene block copolymer and economic efficiency. A combination of (a) one or more kinds of solvents selected from the group consisting of 1-chloropropane, 1-chlorobutane, and 1-chloropentane and (b) one or more kinds of solvents selected from the group consisting of pentane, hexane, heptane, cyclohexane, methylcyclohexane, and ethylcyclohexane is optimum in terms of solubility, economic efficiency, reactivity, and easiness of distillation in an aftertreatment process.

In view of (i) a viscosity of a solution of the block-structured polymer of one or more embodiments of the present invention which block-structured polymer includes the block (a) and the block (b) and (ii) easiness of heat removal of that solution, the organic solvent is set so that a resultant block-structured polymer may have a concentration of 1% by weight to 50% by weight, or of 3% by weight to 35% by weight.

It is generally known that cationic polymerization (described earlier) is inhibited by mixing of moisture. Thus, moisture in a solvent is desirably removed before the solvent is used for polymerization. A method for removing moisture can be exemplified by a method in which moisture is removed by addition and contact of calcium chloride, which is a common dehydrating agent, molecular sieves, or the like.

A solvent that is used in polymerization can be more sophisticatedly purified by distillation. Distillation makes it possible to remove almost all impurities that differ in boiling point. Distillation may be batch distillation or continuous distillation.

For example, in the case of batch distillation, a low-boiling impurity can be removed by extracting an overhead distillate at an early stage of distillation, and a high-boiling impurity can be removed by extracting a bottom residual solution after distillation. In the case of continuous distillation, an impurity can be removed by one or more distillation columns in accordance with a kind of an impurity to be removed.

A polymerization reaction is carried out by polymerizing components that are mixed while being cooled at a temperature of, for example, not less than −100° C. and less than 0° C. In terms of energy cost and stability of the polymerization reaction, the mixing may be carried out at a temperature in a range of −80° C. to −30° C.

According to one or more embodiments of the present invention, in a case where a polymer solution of the block (a) containing the isoolefin monomer (A) and the alkylstyrene (B) as main components is produced, and in a case where a polymer solution of the block-structured polymer including the block (a) and the block (b) is produced subsequently to the production of the polymer solution of the block (a), it is not particularly limited, for example, how and in what order to add the Lewis acid catalyst, the polymerization initiator, the electron donor component, monomer components, and the like. In one or more embodiments, a preferable addition method is exemplified by the following method. Specifically, a polymerization solvent is filled into a polymerization container, the polymerization solvent is sufficiently cooled, and then a monomer component (the isoolefin monomer (A)) that is less reactive among monomers is added. Thereafter, the polymerization initiator, which slightly changes in temperature in a system due to its small amount, and the electron donor component are added at any time, and the Lewis acid catalyst is finally added, so that initiation reactions starting from the polymerization initiator are simultaneously carried out. Such a method for adding the polymerization initiator, the electron donor component, and the Lewis acid catalyst as described above may be preferable from the viewpoint of molecular weight control. Then, in order to obtain the block (a) in which the isoolefin monomer (A) and the alkylstyrene (B) are randomly connected, a polymer solution of the block (a) may be preferably produced by further dripping, in small portions, a mixed solution containing (i) a monomer component (the alkylstyrene (B)) that is more reactive and (ii) a solvent. Subsequently to the production of the polymer solution of the block (a), a solution of the block-structured polymer including the block (a) and the block (b) may be preferably produced by adding the block (b) after substantially a whole amount (e.g., 99% by weight) of the alkylstyrene (B) is consumed so that the block (a) is obtained.

<<Functionalization Method>>

<Halogenation Reaction>

According to the thermoplastic elastomer of one or more embodiments of the present invention, after monomers are polymerized in the presence of a catalyst, halogen may be introduced into an alkylstyrene-derived alkyl group by subjecting a resultant polymer to a halogenation reaction. Specifically, after monomers are polymerized in the presence of a catalyst, halogen may be introduced into an alkylstyrene-derived alkyl group by obtaining the block-structured polymer including the block (a) and the block (b), and then subjecting the obtained block-structured polymer to a halogenation reaction.

In other words, the method in accordance with one or more embodiments of the present invention for producing a thermoplastic elastomer may include not only a block-structured polymer synthesizing step of producing the thermoplastic elastomer by (i) forming the block (a) by polymerizing the isoolefin monomer (A) and the alkylstyrene (B) by continuously dripping the alkylstyrene (B) into the isoolefin monomer (A) while maintaining, at a concentration which is not more than a given concentration, an amount of substance of an unreacted portion of the alkylstyrene (B) in a polymerization solution, and (ii) subsequently forming the block (b) by polymerizing the aromatic vinyl monomer, but also a halogen group introducing step of introducing a halogen group into the thermoplastic elastomer.

As a halogen source, a conventionally known halogen source such as molecular halogen ($X_2$), N-chlorosuccinimide, or N-bromosuccinimide can be suitably used, and molecular halogen ($X_2$) may be more preferable in terms of availability, economic efficiency, and handleability. As the molecular halogen, chlorine, bromine, or iodine can be used, chlorine or bromine may be more preferably used from the viewpoint of material stability, and bromine may be more preferably used from the viewpoint of adhesion.

According to a halogenation method, a halogen reaction may be carried out by use of a radical from a radical initiator that generates a radical in response to heat or light. Alternatively, a halogen reaction may be carried out by exciting halogen by casting a light of a suitable wavelength on the halogen.

The molecular halogen ($X_2$) may be used in an amount of 0.1 equivalents to 50 equivalents, or of 0.2 equivalents to 20 equivalents, or of 0.3 equivalents to 5 equivalents, relative to the number of moles of the alkylstyrene (B) such as methyl styrene which is present in the thermoplastic elastomer in a binding state.

According to one or more embodiments of the present invention, the molecular halogen ($X_2$) may be fed into a system as it is, or may be fed by being diluted at any concentration with, for example, a solvent that is used during halogenation.

A halogenation reaction of one or more embodiments of the present invention can be carried out in solid form or in a solution. Note, however, that the block-structured polymer including the block (a) and the block (b) may be more preferably halogenated in a solution by use of, for example, an aliphatic hydrocarbon solvent, an alicyclic hydrocarbon solvent, or a halogenated hydrocarbon solvent.

In one or more embodiments, the hydrocarbon solvent is exemplified by butane, pentane, hexane, heptane, octane, nonane, decane, 2-methylpropane, 2-methylbutane, 2,3,3-trimethylpentane, 2,2,5-trimethylhexane, cyclohexane, methylcyclohexane, ethylcyclohexane, paraffin oil, benzene, toluene, xylene, ethylbenzene, propylbenzene, butylbenzene, and the like.

In one or more embodiments, the halogenated hydrocarbon solvent is exemplified by methyl chloride, methylene chloride, chloroethane, dichloroethane, 1-chloropropane, 1-chloro-2-methylpropane, 1-chlorobutane, 1-chloro-2-methylbutane, 1-chloro-3-methylbutane, 1-chloro-2,2-dimethylbutane, 1-chloro-3,3-dimethylbutane, 1-chloro-2,3-dimethylbutane, 1-chloropentane, 1-chloro-2-methylpentane, 1-chloro-3-methylpentane, 1-chloro-4-methylpentane, 1-chlorohexane, 1-chloro-2-methylhexane, 1-chloro-3-methylhexane, 1-chloro-4-methylhexane, 1-chloro-5-methylhexane, 1-chloroheptane, 1-chlorooctane, 2-chloropropane, 2-chlorobutane, 2-chloropentane, 2-chlorohexane, 2-chloroheptane, 2-chlorooctane, chlorobenzene, and the like. These halogenated hydrocarbon solvents can be used in one kind or in combination of two or more kinds.

According to the halogenation reaction of one or more embodiments of the present invention, a combination of (a) one or more kinds of solvents selected from the group consisting of 1-chloropropane, 1-chlorobutane, and 1-chloropentane and (b) one or more kinds of solvents selected from the group consisting of pentane, hexane, heptane, cyclohexane, methylcyclohexane, and ethylcyclohexane is optimum in terms of solubility, economic efficiency, reactivity, and easiness of distillation in an aftertreatment process. Among these solvents, especially a solvent used in polymerization may be used again also in the halogenation reaction.

In view of (i) a viscosity of the block-structured polymer during the halogenation reaction and (ii) easiness of heat removal of the block-structured polymer during the halogenation, the organic solvent is set so that the block-structured polymer which has not been halogenated has a concentration of 1% by weight to 50% by weight, or of 3% by weight to 35% by weight.

A temperature of a solution of the block-structured polymer during the halogenation reaction of one or more embodiments of the present invention is adjusted from the viewpoint of, for example, efficiency of a reaction, stability of a polymer, and a boiling point of a solvent. In order that the halogenation reaction is efficiently carried out, it may be preferable that the halogenation reaction be carried out at a solution temperature of 0° C. to 100° C., and it may be more preferable that the halogenation reaction be carried out while the solution temperature is maintained at a temperature between 10° C. and 80° C. The solution of the block-structured polymer which solution has a temperature of not less than 0° C. may be economically preferable because such a solution does not need to be subjected to a separate cooling process. The solution of the block-structured polymer which solution has a temperature of not more than 100° C. may be also economically preferable because such a solution does not need to be heated.

According to the halogenation reaction of one or more embodiments of the present invention which halogenation reaction is carried out by light excitation, light having a wavelength of 100 nm to 800 nm is may be applied, or light having a wavelength of 200 nm to 700 nm may be applied. Light which has a wavelength of not less than 100 nm may be preferable because (i) such light is used in a halogenation reaction, (ii) there is no fear that such light causes a side reaction that may serve as damage to a skeleton of a polymer main chain, and (iii) such light makes it possible to efficiently obtain a desired polymer. Light which has a wavelength of not more than 800 nm may be also preferable because such light allows a halogenation reaction to efficiently progress. As a halogen group to be introduced by the halogenation reaction, bromine in particular may be more preferably introduced from the viewpoint that bromine has an absorption region in a visible light region and thus makes it possible to produce a halogenated polymer without damaging the polymer. In a case where bromine is introduced, light may have a wavelength of 400 nm to 800 nm, or of 460 nm to 750 nm in the halogenation reaction.

<Reaction of Introduction of Functional Group Other than Halogen>

According to the thermoplastic elastomer of one or more embodiments of the present invention, after the monomers are polymerized in the presence of the catalyst and the halogen group is introduced by the method (described earlier), a functional group other than the halogen group may be introduced by causing the halogen group to react with a functionalizing agent.

In other words, the method in accordance with one or more embodiments of the present invention for producing a thermoplastic elastomer may include not only the block-structured polymer synthesizing step and the halogen group introducing step but also a step of introducing a functional group other than the halogen group by causing the halogen group of the thermoplastic elastomer into which the halogen group has been introduced to react with a functionalizing agent.

A method for carrying out the reaction is exemplified by a reaction carried out after the thermoplastic elastomer into which the halogen group is formed into a Grignard reagent, nucleophilic substitution reactions ($S_N1$ and $S_N2$ reactions), dehydrohalogenation reactions (E1 and E2 reactions), and the like. Reaction conditions differ in accordance with various reactions. For example, the $S_N2$ reaction may be carried out in an aprotic polar solvent, and the E2 reaction may be carried out in the presence of a strong base.

The functional group introduced is exemplified by, but not particularly limited in kind to, an alkenyl group (—C═C—), an alkynyl group (—C═C), a halogen group (—F, —Cl, —Br, —I), a hydroxy group (—OH), an amino group (—N—), an imino group (═N—), an N-oxide group (—N→O), an N-hydroxy group (—N—OH), a nitro group ($—NO_2$), a nitroso group (—NO), an azo group (—N═N—), a diazo group ($—Ni^+≡N$), an azide group ($—N_3$), an oxy group (—O—), an oxo group (═O), a carbonyl group (—CO—), a phenyl group, a phosphino group, a thio group (—S—), an S-oxide group (S→O), a thioxy group (═S), and the like.

<<Resin Composition>>

In order not to change a physical property of a thermoplastic elastomer due to an external factor during a production and molding process, it is possible to blend a stabilizer and a stabilization assistant with the thermoplastic elastomer of one or more embodiments of the present invention.

The stabilizer is exemplified by antioxidants such as a hindered phenolic antioxidant, a phosphoric ester antioxidant, an amine antioxidant, and a sulfuric antioxidant; ultraviolet absorbers such as a benzothiazole ultraviolet absorber and a benzophenone ultraviolet absorber; and photo stabilizers such as a hindered amine photo stabilizer.

The stabilization assistant is exemplified by organic stabilization assistants such as a phosphite, an epoxide, and β-diketone, and inorganic stabilization assistants such as perchloric metallic salt and hydrotalcite.

A recommended blended amount of each of the stabilizer and the stabilization assistant may be 0.000001 parts by weight to 50 parts by weight, or 0.00001 parts by weight to 10 parts by weight, relative to 100 parts by weight of the thermoplastic elastomer of one or more embodiments of the present invention.

The stabilizer and the stabilization assistant may be used alone or in combination of two or more kinds.

<<Applications>>

The thermoplastic elastomer of one or more embodiments of the present invention is rich in gas barrier property and plasticity, and excellent in molding processability, rubber characteristic, mechanical strength, and permanent compression set characteristic. Thus, the thermoplastic elastomer of one or more embodiments of the present invention can be used for the applications below.

(1) Modifier: resin modifier (thermoplastic resin impact-resistant modifier, thermoplastic resin vibration-damping modifier, thermoplastic resin gas barrier modifier, thermoplastic resin softener, etc.; thermosetting resin impact-resistant modifier, thermosetting resin stress-reducing agent, etc.), asphalt modifier (asphalt modifier for road, asphalt modifier for waterproof sheet, waterproof material for bridge floor slab), tire modifier (tire wet gripping property improving agent), and rubber modifier (2) Adhesive or pressure sensitive adhesive: hot melt adhesive, aqueous adhesive, solvent adhesive, and pressure sensitive adhesive (3) Viscosity modifier: viscosity modifier to be added to oil, lubricant, or the like (4) Coating agent: base resin for use in, for example, paint, and sealant (5) Material for use in, for example, PVC substitution: electric wire covering material such as cable, connector, and plug; toy such as doll; curing tape; logo (for sportswear and sports shoes); carry bag; wrapping material for clothes; hood for truck; agricultural film (for greenhouse cultivation); eraser; professional-use apron (tarpaulin); building interior material such as floor material and ceiling material; skin material for raincoat, umbrella, shopping bag, chair, sofa, and the like; skin material for belt, bag, and the like; garden hose, gasket (packing) of refrigerator, flexible hose of washing machine or vacuum cleaner; and automobile interior material (6) Vibration-damping material, vibration-proofing material, or cushioning material: vibration-damping material (especially multilayer vibration-damping material combined with aluminium or steel plate), vibration-proofing material, cushioning material (used for architectural application, automotive application, floor vibration-damping application, flooring application, playgame tool application, precision device application, and electronic device application), shoe sole, grips of stationery and toy utensils, grips of daily goods and carpenter tools, grips of golf club, bat, and the like, core materials of golf club, bat, and the like, rubbers of tennis racket, table tennis racket, and the like, and grips of tennis racket, table tennis racket, and the like.

(7) Soundproof material or sound absorbing material: automobile interior/exterior material, automobile ceiling material, railway vehicle material, and piping material (8) Sealing material: gasket, architectural gasket, tap body, glass sealing material for laminated glass and double glass, wrapping material, sheet, multilayer sheet, gas barrier material for container, multilayer container, and the like, civil engineering sheet, waterproof sheet, wrapping transport material, sealant, medical medicinal tap, and syringe gasket (9) Tube: medical tube, ink tube, food tube, and tire tube

(10) Foam: foam obtained by beads foaming, decompression foaming, or extrusion foaming (pipe covering material, synthetic wood, woof flour foam, etc.), and carrier of foaming agent in chemical foaming or physical foaming

(11) Others: clothing application; flame retarder application; cap closer; cap; bag; gasket; hose; shoes; sporting goods; foamable fireproof sheet, air bag cover, bumper, interior parts (skin material for instrumental panel, skin material for gear lever knob or the like, etc.), weather strip, roof molding, under door molding, automotive member such as tire inner liner; microwave food tray, portion food container, laminate film for food container, polystyrene sheet for food container (raw fish container, egg pack, etc.), instant noodle container, polystyrene mesh foam, frozen dessert cup, food container such as transparent beverage cup; IC tray; CD-ROM chassis; hubcap; elastic yarn; nonwoven fabric; wire harness; back sheet of disposable diaper; two-color molding compound material; underwater goggles; personal computer mouse; cushion; and stopper

EXAMPLES

One or more embodiments of the present invention are more specifically described below in Examples, but the present invention is not limited by these Examples. Note that in Examples (described later), "p-methyl styrene" may be referred to as "pMSt", and "pMSt-derived unit" may be referred to as "pMSt group". Note also that "isobutylene" may be referred to as "IB" in Examples (described later).

(Molecular Weight Measurement)

In Examples (described later), "number average molecular weight (Mn)", "weight average molecular weight (Mw)", and "molecular weight distribution (ratio between weight average molecular weight and number average molecular weight)" of each of the block (a), and the block-structured polymer before halogenation which block-structured polymer includes the block (a) and the block (b), and the block-structured polymer after halogenation which block-structured polymer includes the block (a) and the block (b) were calculated by a standard polystyrene reduction method in which size exclusion chromatography (SEC) was used. Measurement was carried out by using, as a measurement device, a 510-type GPC system (manufactured by Waters), regarding chloroform as a mobile phase, setting a column temperature at 35° C., pouring, into the GPC, a sample solution having a polymer concentration of 4 mg/ml. As a reference sample, polystyrene was used.

(Number of p-Methyl Styrene (pMSt) Groups and Number of Halogenated pMSt Groups)

In Examples (described later), (i) the number of pMSt groups contained in one molecule of a thermoplastic elastomer before halogenation and (ii) the number of halogenated pMSt groups contained in one molecule of the thermoplastic elastomer after halogenation were calculated by the following method.

Specifically, the number of pMSt groups contained in one molecule of the thermoplastic elastomer before halogenation was determined by the following method. A percentage (mol %) of a pMSt-derived unit contained in the block (a) was determined by a ratio between (a) an IB-derived proton measured by use of $^{1}$H NMR and (b) a pMSt-derived proton measured by use of $^{1}$H NMR. From the percentage (mol %) of the pMSt-derived unit contained in the block (a), a weight average molecular weight of the block (a) which weight average molecular weight was measured by the method (described earlier), a molecular weight (56.11) of isobutylene, and a molecular weight (118.18) of pMSt, the number of pMSt groups contained in one molecule of the block (a), i.e., the number of pMSt groups contained in one molecule of the thermoplastic elastomer was calculated by solving the following simultaneous equations.

$M_w$ of block ($a$)=56.11×IB unit+118.18×pMS unit     Equation 1:

Percentage (mol %) of pMSt-derived unit contained in block ($a$)/100=pMS unit/(pMS unit+IB unit)     Equation 2:

Note that in each of Equations 1 and 2, "IB unit" represents the number of isobutylene-derived units contained in the block (a), and "pMS unit" represents the number of pMSt-derived units contained in the block (a).

Further, the number of halogenated pMSt groups contained in one molecule of the thermoplastic elastomer after halogenation was determined by the following method. A percentage (mol %) of a halogenated pMSt-derived unit contained in the block (a) after halogenation was determined by a ratio among (a) an IB-derived proton measured by use of $^{1}$H NMR, (b) a halogenated pMSt-derived proton measured by use of $^{1}$H NMR, and (c) an unhalogenated pMSt-derived proton measured by use of $^{1}$H NMR. The percentage (mol %) of the halogenated pMSt-derived unit contained in the block (a) after halogenation, i.e., a percentage (mol %) of the halogenated pMSt-derived unit contained in the thermoplastic elastomer after halogenation is expressed by the following Equation 3:

Percentage (mol %) of halogenated pMSt-derived unit contained in block ($a$)/100=halogenated pMS unit/(halogenated pMS unit+pMS unit+IB unit)     Equation 3:

where "halogenated pMS unit" represents the number of halogenated pMSt-derived units contained in the block (a), "IB unit" represents the number of isobutylene-derived units contained in the block (a), and "pMS unit" represents the number of pMSt-derived units contained in the block (a).

In Equation 3, since (halogenated pMS unit+pMS unit+IB unit) is equal to (pMS unit+IB unit) before halogenation, the number of halogenated pMSt-derived units contained in the block (a), i.e., the number of halogenated pMSt groups contained in one molecule of the thermoplastic elastomer was determined by solving Equation 3 by use of (pMS unit+IB unit) found by solving the above simultaneous equations (Equations 1 and 2). Note that "halogenated pMSt-derived unit" herein refers to a sum of a monosubstituted product of halogen (e.g., Br) and a disubstituted product of halogen (e.g., Br).

(Position of pMSt Group)

pMSt is polymerized while being mixed with an unreacted portion of an isoolefin monomer. Thus, the pMSt is randomly arranged in an isoolefin polymer. Especially in Examples (described later), a reaction solution was extracted at any time during a polymerization reaction, and gas chromatography (manufactured by Shimadzu Corporation, model number GC-17A) was used to measure respective concentrations of an unreacted portion of isobutylene and an unreacted portion of p-methyl styrene, so that it was confirmed that isobutylene and p-methyl styrene had been consumed together at a constant rate.

(Maximum pMSt Concentration)

In Examples (described later), a reaction solution was extracted at any time during a polymerization reaction, and gas chromatography (manufactured by Shimadzu Corporation, model number GC-17A) was used to measure a concentration of an unreacted portion of p-methyl styrene. A ratio of a mass (mol) of the unreacted portion of p-methyl styrene, which unreacted portion had been subjected to the measurement, to a total mass (mol) of isobutylene which had been used in the polymerization reaction was calculated, and a value of the ratio which was the highest during the polymerization reaction was regarded as a maximum pMSt concentration.

(Breaking Strength: Tb)

In conformity with JIS K 6251, a dumbbell-shaped No. 7-type piece punched out from an evaluation sheet pressed to have a thickness of 2.0 mm and shown in (Production Example 1) was prepared as a test piece, and the test piece was used to measure a breaking strength: Tb. A tensile speed was set at 200 mm/min.

(Breaking Elongation: Eb)

In conformity with JIS K 6251, a dumbbell-shaped No. 7-type piece punched out from an evaluation sheet pressed to have a thickness of 2.0 mm and shown in (Production Example 1) was prepared as a test piece, and the test piece was used to measure a breaking elongation: Eb. A tensile speed was set at 200 mm/min.

(Adhesion)

Adhesion of a thermoplastic elastomer to isoprene rubber was evaluated. A piece of release paper on one side of a sheet (adhesive layer) of a halogenated thermoplastic elastomer which sheet had been pressed to have a thickness of 0.5 mm and is shown in (Production Example 2) was peeled off. Then, with an exposed surface of the halogenated thermoplastic elastomer, the nylon mesh side surface of a test piece being a support layer and shown in (Production Example 3) was combined. Subsequently, a piece of release paper on the other side of the above (adhesive layer) was peeled off. Then, with an exposed surface of the halogenated thermoplastic elastomer, an unvulcanized sheet (base material layer) of isoprene rubber which unvulcanized sheet had a thickness of 2 mm and is shown in (Production Example 4) was combined. A layer obtained by combining the adhesive layer, the support layer, and the base material layer was subjected to under heating and pressure at 150° C. and 50 MPa for 40 minutes so that the base material layer was vulcanized. Then, a piece of the sheet which piece had a width of 2 cm×6 cm was cut out. Thereafter, a 180° peel test was carried out, and a stress was measured during the test. The test was carried out at a speed of 200 mm/min, and an average (N) of stresses obtained as a result of the test was employed. In accordance with obtained results, adhesion was evaluated by the criteria below.

Evaluation 4: not less than 75N
Evaluation 3: not less than 50N and less than 75N
Evaluation 2: not less than 30N and less than 50N
Evaluation 1: less than 30N (Heat Resistance)

In conformity with JIS K-6394, a piece of 5 mm×6 mm which piece had been cut out from an evaluation sheet pressed to have a thickness of 2.0 mm and shown in (Production Example 1) was prepared as a test piece. Then, dynamic viscoelastic behavior of the test piece was measured in a shearing mode at a frequency of 10 Hz and a strain of 0.05% while a temperature of the test piece was being raised at a rate of 4° C./min in a range of −80° C. to 250° C. A ratio of a value of a storage elastic modulus (Pa) at 200° C. to a storage elastic modulus (Pa) at 23° C. (%; (storage elastic modulus (Pa) at 200° C./storage elastic modulus (Pa) at 23° C.)×100) was used as an indicator of heat resistance.

In accordance with obtained results, heat resistance was evaluated by the criteria below.

Evaluation 5: not less than 19%
Evaluation 4: not less than 16% and less than 19%
Evaluation 3: not less than 13% and less than 16%
Evaluation 2: not less than 10% and less than 13%
Evaluation 1: not less than 7% and less than 10%

(Production Example 1) Preparation of Evaluation Sheet

To 100 parts by weight of an obtained thermoplastic elastomer, 5 parts by weight of DHT-4V (Registered Trademark, manufactured by Kyowa Chemical Industry Co., Ltd.) as a stabilization assistant and 0.5 parts by weight of ADK STAB AO-50 (manufactured by ADEKA CORPORATION) as an antioxidant were added. A resultant mixture was kneaded at 170° C. and 50 rpm for 3 minutes. Thereafter, the mixture was subjected to vacuum defoaming for 1 minute and further pressed by use of a pressing machine which had been heated to 170° C. in advance, so that a sheet having a thickness of 2 mm was obtained.

(Production Example 2) Preparation of Adhesive Layer (Halogenated Thermoplastic Elastomer)

A sheet sample having a thickness of 0.5 mm was obtained by pressing, at 170° C. for 8 minutes, 15 g of a halogenated thermoplastic elastomer which was sandwiched between pieces of release paper.

(Production Example 3) Preparation of Support Layer

A sheet sample piece having a thickness of 2 mm was obtained by pressing 40 g of a pellet of SIBSTAR (Registered Trademark) 102T (manufactured by KANEKA CORPORATION) at 200° C. for 8 minutes. Subsequently, the sample piece on which a nylon mesh was placed was pressed again at 200° C. for 8 minutes, so that a support layer sample in which the nylon mesh and the SIBSTAR 102T were pressure-bonded was obtained.

(Production Example 4) Preparation of Base Material Layer (Isoprene Rubber Sheet)

Into a 1 L kneader (manufactured by MORIYAMA) set at 40° C., 400 g of isoprene rubber (manufactured by JSR Corporation, trade name: "IR2200") and 200 g of carbon black (manufactured by Asahi Carbon Co., Ltd., Asahi #50) were fed. Then, a resultant mixture was kneaded at 50 rpm for 5 minutes. Thereafter, into the kneader, 6 g of sulfur, 8 g of N-tert-butyl-2-benzothiazolesulfenamide, 8 g of zinc oxide, and 8 g of stearic acid were fed. Then, a resultant mixture was kneaded for 2 minutes. Thereafter, the kneaded mixture was discharged from the kneader, and the mixture was formed, by use of a hot-press (manufactured by SHINTO Metal Industries Corporation) at 80° C., into a sheet having a thickness of 2 mm.

Example 1

To a 2 L separable flask in which nitrogen substitution had been carried out, 274.5 mL of butyl chloride (dried by use of molecular sieves after distillation) and 117.6 mL of hexane (dried by use of molecular sieves after distillation) were added by use of a syringe. A polymerization container (the separable flask) was cooled by being immersed in dry ice/ethanol at −80° C., and then 93.9 mL (1.016 mol) of an isobutylene monomer was added. Subsequently, 0.160 g (0.69 mmol) of p-dicumylchloride and 0.210 g (2.1 mmol) of triethylamine were added. Next, 2.05 ml (0.691 mmol) of titanium (IV) isopropoxide was added, and a temperature within the system was decreased to −70° C. Then, 5.30 mL (0.0484 mol) of titanium tetrachloride was added so as to initiate polymerization. Immediately after titanium tetrachloride was fed, a whole amount of a mixed solution of 3.265 g (0.0276 mol) of p-methyl styrene, 5.78 g of butyl chloride, and 1.84 g of hexane was dripped by use of a syringe pump at a flow rate of 0.363 g/min over 30 minutes. A speed at which pMSt was fed per minute was 1.8 mM/min relative to a volume of a reaction solution at an end of dripping of pMSt. The reaction solution was extracted at any time during the reaction, and respective concentrations of isobutylene and p-methyl styrene were measured. As a result of the measurement, it was confirmed (i) that an unreacted portion of p-methyl styrene had a highest concentration at the end of dripping of p-methyl styrene and p-methyl styrene at that time had an amount of substance (mol) which amount was 1/128 (mol/mol) relative to a total amount of substance of isobutylene, i.e., a fed amount (mol) of the isobutylene monomer and (ii) that isobutylene and p-methyl styrene had been consumed together at a constant rate. After the elapse of 76 minutes from the feeding of titanium tetrachloride, it was confirmed by gas chromatography that 99% by weight of isobutylene and p-methyl styrene had been consumed. At that time, a random copolymer (polymer block (a)) of isobutylene and p-methyl styrene had a weight average molecular weight of 99,000, a number average molecular weight of 70,000, and a molecular weight distribution of 1.41. After the elapse of minutes from the feeding of titanium tetrachloride, 13.85 ml (0.12 mol) of a styrene monomer was fed. After the elapse of 58 minutes from the feeding of the styrene monomer, it was confirmed by gas chromatography that 90% by weight of the fed styrene monomer had been consumed. Subsequently, the reaction solution as a whole was poured into 0.3 L of a 2.8% by weight aqueous sodium hydroxide solution heated to 70° C., and a resultant solution was vigorously stirred by use of a mechanical stirrer for 60 minutes, so that polymerization was stopped. Next, washing with 0.3 L of pure water was repeated 2 times. Thereafter, a volatile matter such as a solvent was removed by distillation under heating and dried, so that 70 g of a thermoplastic elastomer including a polystyrene block (polymer block (b)) and a methyl styrene-isobutylene copolymer (polymer block (a)) was obtained. The obtained thermoplastic elastomer had a weight average molecular weight of 117,000, a number average molecular weight of 76,000, and a molecular weight distribution of 1.53. Results of various physical properties of the thermoplastic elastomer were Tb: 3.19 MPa and Eb: 1357%. Table 1 shows the results.

Example 2

To a 2 L separable flask in which nitrogen substitution had been carried out, 274.5 mL of butyl chloride (dried by use of molecular sieves after distillation) and 117.6 mL of hexane (dried by use of molecular sieves after distillation) were added by use of a syringe. A polymerization container (the separable flask) was cooled by being immersed in dry ice/ethanol at −80° C., and then 93.9 mL (1.016 mol) of an isobutylene monomer was added. Subsequently, 0.160 g (0.69 mmol) of p-dicumylchloride and 0.210 g (2.1 mmol) of triethylamine were added. Next, 2.05 ml (0.691 mmol) of titanium tetraisopropoxide was added, and a temperature within the system was decreased to −70° C. Then, 5.30 mL (0.0484 mol) of titanium tetrachloride was added so as to initiate polymerization. Immediately after titanium tetrachloride was fed, a whole amount of a mixed solution of 3.265 g (0.0276 mol) of p-methyl styrene, 5.78 g of butyl chloride, and 1.84 g of hexane was dripped by use of a syringe pump at a flow rate of 0.1814 g/min over 60 minutes. A speed at which pMSt was fed per minute was 0.9 mM/min relative to a volume of a reaction solution at an end of dripping of pMSt. The reaction solution was extracted at any time during the reaction, and respective concentrations of isobutylene and p-methyl styrene were measured. As a result of the measurement, it was confirmed (i) that an unreacted portion of p-methyl styrene had a highest concentration at the end of dripping of p-methyl styrene and p-methyl styrene at that time had an amount of substance (mol) which amount was 1/208 (mol/mol) relative to a total amount of substance of isobutylene, i.e., a fed amount (mol) of the isobutylene monomer and (ii) that isobutylene and p-methyl styrene had been consumed together at a constant rate. After the elapse of 128 minutes from the feeding of titanium tetrachloride, it was confirmed by gas chromatography that 99% by weight of isobutylene and p-methyl styrene had been consumed. At that time, a random copolymer (polymer block (a)) of isobutylene and p-methyl styrene had a weight average molecular weight of 108,000, a number average molecular weight of 101,000, and a molecular weight distribution of 1.07. After the elapse of 140 minutes from the feeding of titanium tetrachloride, 13.85 ml (0.12 mol) of a styrene monomer was fed. After the elapse of 113 minutes from the feeding of the styrene monomer, it was confirmed by gas chromatography that 85% by weight of the fed styrene monomer had been consumed. Subsequently, the reaction solution as a whole was poured into 0.3 L of a 2.8% by weight aqueous sodium hydroxide solution heated to 70° C., and a resultant solution was vigorously stirred by use of a mechanical stirrer for 60 minutes, so that polymerization was stopped. Next, washing with 0.3 L of pure water was repeated 2 times. Thereafter, a volatile matter such as a solvent was removed by distillation under heating and dried, so that 70 g of a thermoplastic elastomer including a polystyrene block (polymer block (b)) and a methyl styrene-isobutylene copolymer (polymer block (a)) was obtained. The obtained thermoplastic elastomer had a weight average molecular weight of 115,000, a number average molecular weight of 58,000, and a molecular weight distribution of 1.99. Results of various physical properties of the thermoplastic elastomer were Tb: 3.42 MPa and Eb: 1178%. Table 1 shows the results.

Example 3

To a container of a 200 L SUS-made polymerization device in which container nitrogen substitution had been carried out, 74.334 L of butyl chloride (dried by use of molecular sieves) and 23.731 L of hexane (dried by use of molecular sieves) were added via a pipe. The polymerization device was cooled by causing brine at −80° C. to pass through a jacket of the polymerization device, and then 29.329 L (310.49 mol) of an isobutylene monomer was added. Subsequently, 48.805 g (0.211 mol) of p-dicumylchloride and 64.09 g (0.63 mol) of triethylamine were added. Next, 625 ml (2.11 mol) of titanium tetraisopropoxide was added, and a temperature within the system was decreased to −70° C. Then, 1.621 L (14.78 mol) of titanium tetrachloride was added so as to initiate polymerization. Immediately after titanium tetrachloride was fed, a whole amount of a mixed solution of 1.113 kg (9.42 mol) of p-methyl styrene, 2.903 kg of butyl chloride, and 0.927 kg of hexane was dripped by use of dripping equipment at a flow rate of 164.76 g/min over 30 minutes. A speed at which pMSt was fed per minute was 1.8 mM/min relative to a volume of a reaction solution at an end of dripping of pMSt. The reaction solution was extracted at any time during the reaction, and respective concentrations of isobutylene and p-methyl styrene were measured. As a result of the measurement, it was confirmed (i) that an unreacted portion of p-methyl styrene had a highest concentration at the end of dripping of p-methyl styrene and p-methyl styrene at that time had an amount of substance (mol) which amount was 1/196 (mol/mol) relative to a total amount of substance of isobutylene, i.e., a fed amount (mol) of the isobutylene monomer and (ii) that isobutylene and p-methyl styrene had been consumed together at a constant rate. After the elapse of 104 minutes from the feeding of titanium tetrachloride, it was confirmed by gas chromatography that 99% by weight of isobutylene and p-methyl styrene had been consumed. At that time, a random copolymer (polymer block (a)) of isobutylene and p-methyl styrene had a weight average molecular weight of 100,000, a number average molecular weight of 74,000, and a molecular weight distribution of 1.35. After the elapse of 120 minutes from the feeding of titanium tetrachloride, 4.235 L (36.78 mol) of a styrene monomer was fed. After the elapse of 120 minutes from the feeding of the styrene monomer, it was confirmed by gas chromatography that 80% by weight of the fed styrene monomer had been consumed. Subsequently, the reaction solution as a whole was poured into 125 L of a 2.8% by weight aqueous sodium hydroxide solution heated to 70° C., and a resultant solution was vigorously stirred for 60 minutes, so that polymerization was stopped. Next, washing with 125 L of pure water was repeated 2 times. Thereafter, a volatile matter such as a solvent was removed by distillation under heating and dried, so that 21.3 kg of a thermoplastic elastomer including a polystyrene block (polymer block (b)) and a methyl styrene-isobutylene copolymer (polymer block (a)) was obtained. The obtained polymer had a weight average molecular weight of 119,000, a number average molecular weight of 78,000, and a molecular weight distribution of 1.52. Results of various physical properties of the thermoplastic elastomer were Tb: 3.28 MPa and Eb: 1249%.

In a 20 L flask, 2025.9 g of the thermoplastic elastomer obtained by the above method was dissolved into 7715.2 g of 1-chlorobutane and 2463.1 g of n-hexane. A resultant solution was subjected to nitrogen bubbling for minutes, and thereafter the resultant solution was subjected to a nitrogen flow instead of the nitrogen bubbling. Further, 192.3 g of bromine ($Br_2$) was fed into the solution while light was blocked so as to prevent exposure of the system as a whole to light as much as possible. A resultant solution was sufficiently stirred, and it was confirmed that the solution had a uniform color. Then, a bromination reaction was carried out by light irradiation from outside the flask by use of 4 household visible light LED lamps (10 W). After the elapse of 95 minutes from a start of light irradiation, light irradiation was stopped. Then, 1639.2 g of a 9% by weight aqueous $Na_2SO_3$ solution was fed into a reaction solution, and a resultant solution was stirred until brown faded. Thereafter, the solution was subjected to stationary separation for 90 minutes, so that an aqueous phase was discharged from the solution. To the solution from which the aqueous phase was discharged, 1000.0 g of water was further added. Then, a resultant solution was stirred and left standing. Then, an aqueous phase was discharged from the solution. To the solution from which the aqueous phase was discharged, 2257.6 g of magnesium sulfate was added, so that a resultant solution was dehydrated. Thereafter, filtrate obtained by filtration of the resultant solution was dried overnight at 80° C. under vacuum, so that a thermoplastic elastomer into which bromine was introduced was obtained. $^1$H NMR of the thermoplastic elastomer into which bromine was introduced was measured. As a result of the measurement, it was confirmed (i) that an integral value of a methyl group of p-methyl styrene was reduced to 8% of the integral value before the bromination reaction and (ii) that signals indicative of a monobromomethyl group obtained by replacing, with bromine by the bromination reaction, one of three hydrogen atoms of the methyl group of p-methyl styrene which methyl group had not been subjected to the bromination reaction, and signals indicative of a dibromomethyl group obtained by replacing, with bromine by the bromination reaction, two of the three hydrogen atoms of the methyl group of p-methyl styrene which methyl group had not been subjected to the bromination reaction were generated. From an integral value of these signals, it was calculated that the monobromomethyl group was generated so as to account for 78.9% of the methyl group which had not been subjected to the bromination reaction and the dibromomethyl group was generated so as to account for 4.4% of the methyl group which had not been subjected to the bromination reaction. Since there was no proton, it was impossible to confirm presence or absence of a tribromomethyl group obtained by replacing, with bromine by the bromination reaction, all the three hydrogen atoms of the methyl group of p-methyl styrene which methyl group had not been subjected to the bromination reaction were generated. The obtained thermoplastic elastomer into which bromine was introduced had a weight average molecular weight of 119,000, a number average molecular weight of 73,000, and a molecular weight distribution of 1.63. Results of various physical properties of the thermoplastic elastomer were Tb: 3.3 MPa, Eb: 965%, adhesion: 65N, and heat resistance: 7.5%. Table 1 shows the results.

Example 4

To a 2 L separable flask in which nitrogen substitution had been carried out, 944 mL of butyl chloride (dried by use of molecular sieves after distillation) and 404 mL of hexane (dried by use of molecular sieves after distillation) were added by use of a syringe. A polymerization container (the separable flask) was cooled by being immersed in dry ice/ethanol at −72° C., and then 331 mL (3.499 mol) of an isobutylene monomer was added. Subsequently, 0.55 g (2.38 mmol) of p-dicumylchloride and 0.72 g (7.1 mmol) of triethylamine were added. Next, 6 ml (20 mmol) of titanium tetraisopropoxide was added, and a temperature within the system was decreased to −70° C. Then, 16 mL (0.143 mol) of titanium tetrachloride was added so as to initiate polymerization. Immediately after titanium tetrachloride was fed, a whole amount of 11.2 g (95 mmol) of p-methyl styrene was dripped by use of a syringe pump at a flow rate of 0.373 g/min over 15 minutes. A speed at which pMSt was fed per minute was 3.6 mM/min relative to a volume of a reaction solution at an end of dripping of pMSt. The reaction solution was extracted at any time during the reaction, and respective concentrations of isobutylene and p-methyl styrene were measured. As a result of the measurement, it was confirmed (i) that an unreacted portion of p-methyl styrene had a highest concentration at the end of dripping of p-methyl styrene and p-methyl styrene at that time had an amount of substance (mol) which amount was 1/118 (mol/mol) relative to a total amount of substance of isobutylene, i.e., a fed amount (mol) of the isobutylene monomer and (ii) that isobutylene and p-methyl styrene had been consumed together at a constant rate. After the elapse of 104 minutes from the feeding of titanium tetrachloride, it was confirmed by gas chromatography that 99% by weight of isobutylene and p-methyl styrene had been consumed. At that time, a random copolymer (polymer block (a)) of isobutylene and p-methyl styrene had a weight average molecular weight of 101,000, a number average molecular weight of 94,000, and a molecular weight distribution of 1.08. After the elapse of 106 minutes from the feeding of titanium tetrachloride, 48 ml (0.41 mol) of a styrene monomer was fed. After the elapse of 122 minutes from the feeding of the styrene monomer, it was confirmed by gas chromatography that 82% by weight of the fed styrene monomer had been consumed. Subsequently, the reaction solution as a whole was poured into 0.3 L of a 2.8% by weight aqueous sodium hydroxide solution heated to 50° C., and a resultant solution was vigorously stirred by use of a mechanical stirrer for 60 minutes, so that polymerization was stopped. Next, washing with 0.3 L of pure water was repeated 2 times. Thereafter, a volatile matter such as a solvent was removed by distillation under heating and dried, so that 240 g of a thermoplastic elastomer including a polystyrene block (polymer block (b)) and a methyl styrene-isobutylene copolymer (polymer block (a)) was obtained. The obtained thermoplastic elastomer had a weight average molecular weight of 125,000, a number average molecular weight of 99,000, and a molecular weight distribution of 1.26. Results of various physical properties of the thermoplastic elastomer were Tb: 6.83 MPa and Eb: 1187%. Table 1 shows the results.

In a 5 L flask, 220 g of the thermoplastic elastomer obtained by the above method was dissolved into 851.4 g of 1-chlorobutane and 94.6 g of n-hexane. A resultant solution was subjected to nitrogen bubbling for 60 minutes, and thereafter the resultant solution was subjected to a nitrogen flow instead of the nitrogen bubbling. Then, a solvent was refluxed by immersing the flask in an oil bath heated to 95° C. Further, 14.2 g (89 mmol) of bromine ($Br_2$) and 0.3 g of azobisisobutyronitrile (AIBN) were fed into the solution while light was blocked so as to prevent exposure of the system as a whole to light as much as possible, and a resultant solution was stirred under heating. After the elapse of 20 minutes from the feeding of bromine, 1000 g of water was fed into a reaction solution, and a resultant solution was stirred until brown faded. Thereafter, the solution was subjected to stationary separation for 90 minutes, so that an aqueous phase was discharged from the solution. To the solution from which the aqueous phase was discharged, 1000 g of water was further added. Then, a resultant solution was repeatedly stirred, left standing, and subjected to discharge therefrom of an aqueous phase, so that it was confirmed that the solution had a neutral pH. Thereafter, an organic phase was dried overnight at 80° C. under vacuum, so that a thermoplastic elastomer into which bromine was introduced was obtained. $^1$H NMR of the thermoplastic elastomer into which bromine was introduced was measured. As a result of the measurement, it was confirmed that signals indicative of a monobromomethyl group obtained by replacing, with bromine by the bromination reaction, one of three hydrogen atoms of the methyl group of p-methyl styrene which methyl group had not been subjected to the bromination reaction were generated. From an integral value of these signals, it was calculated that the monobromomethyl group was generated so as to account for 60% of the methyl group which had not been subjected to a bromination reaction.

The obtained thermoplastic elastomer into which bromine was introduced had a weight average molecular weight of 124,000, a number average molecular weight of 86,000, and a molecular weight distribution of 1.44. Results of various physical properties of the thermoplastic elastomer were Tb: 7.0 MPa, Eb: 1133%, adhesion: 53 N, and heat resistance: 8.6%. Table 1 shows the results.

Example 5

To a 2 L separable flask in which nitrogen substitution had been carried out, 1202 mL of butyl chloride (dried by use of molecular sieves after distillation) and 515 mL of hexane (dried by use of molecular sieves after distillation) were added by use of a syringe. A polymerization container (the separable flask) was cooled by being immersed in dry ice/ethanol at −72° C., and then 421 mL (4.45 mol) of an isobutylene monomer was added. Subsequently, 0.7 g (3.03 mmol) of p-dicumylchloride and 0.92 g (9.1 mmol) of triethylamine were added. Next, 9.0 ml (30 mmol) of titanium tetraisopropoxide was added, and a temperature within the system was decreased to −70° C. Then, 23 mL (0.21 mol) of titanium tetrachloride was added so as to initiate polymerization. Immediately after titanium tetrachloride was fed, a whole amount of 9.0 g (76 mmol) of p-methyl styrene was dripped by use of a syringe pump at a flow rate of 0.30 g/min over 30 minutes. A speed at which pMSt was fed per minute was 1.1 mM/min relative to a volume of a reaction solution at an end of dripping of pMSt. The reaction solution was extracted at any time during the reaction, and respective concentrations of isobutylene and p-methyl styrene were measured. As a result of the measurement, it was confirmed (i) that an unreacted portion of p-methyl styrene had a highest concentration at the end of dripping of p-methyl styrene and p-methyl styrene at that time had an amount of substance (mol) which amount was 1/227 (mol/mol) relative to a total amount of substance of isobutylene, i.e., a fed amount (mol) of the isobutylene monomer and (ii) that isobutylene and p-methyl styrene had been consumed together at a constant rate. After the elapse of 76 minutes from the feeding of titanium tetrachloride, it was confirmed by gas chromatography that 99% by weight of isobutylene and p-methyl styrene had been consumed. At that time, a random copolymer (polymer block (a)) of isobutylene and p-methyl styrene had a weight average molecular weight of 106,000, a number average molecular weight of 94,000, and a molecular weight distribution of 1.13. After the elapse of 100 minutes from the feeding of titanium tetrachloride, 61 ml (0.53 mol) of a styrene monomer was fed. After the elapse of 145 minutes from the feeding of the styrene monomer, it was confirmed by gas chromatography that 86% by weight of the fed styrene monomer had been consumed. Subsequently, the reaction solution as a whole was poured into 0.3 L of a 2.8% by weight aqueous sodium hydroxide solution heated to 50° C., and a resultant solution was vigorously stirred by use of a mechanical stirrer for 60 minutes, so that polymerization was stopped. Next, washing with 0.3 L of pure water was repeated 2 times. Thereafter, a volatile matter such as a solvent was removed by distillation under heating and dried, so that 302 g of a thermoplastic elastomer including a polystyrene block (polymer block (b)) and a methyl styrene-isobutylene copolymer (polymer block (a)) was obtained. The obtained thermoplastic elastomer had a weight average molecular weight of 138,000, a number average molecular weight of 112,000, and a molecular weight distribution of 1.24. Table 1 shows the results.

In a 5 L flask, 300 g of the thermoplastic elastomer obtained by the above method was dissolved into 1174 g of 1-chlorobutane. A resultant solution was subjected to nitrogen bubbling for 60 minutes, and thereafter the resultant solution was subjected to a nitrogen flow instead of the nitrogen bubbling. Further, 28.5 g (0.18 mmol) of bromine ($Br_2$) was fed into the solution while light was blocked so as to prevent exposure of the system as a whole to light as much as possible, and a resultant solution was stirred at a room temperature. After the elapse of 120 minutes from the feeding of bromine, 300 g of a 7% by weight aqueous $Na_2SO_3$ solution was fed into a reaction solution, and a resultant solution was stirred until brown faded. Thereafter, the solution was subjected to stationary separation for 30 minutes, so that an aqueous phase was discharged from the solution. To the solution from which the aqueous phase was discharged, 300 g of water was further added. Then, a resultant solution was repeatedly stirred, left standing, and subjected to discharge therefrom of an aqueous phase, so that it was confirmed that the solution had a neutral pH. Thereafter, an organic phase was dried overnight at 80° C. under vacuum, so that a thermoplastic elastomer into which bromine was introduced was obtained. After a bromination reaction, 86% of a methyl group which had not been subjected to the bromination reaction was converted into a monobromomethyl group, and 11% of the methyl group was converted into a dibromomethyl group.

The obtained thermoplastic elastomer into which bromine was introduced had a weight average molecular weight of 130,000, a number average molecular weight of 66,000, and a molecular weight distribution of 1.96. Various results of the thermoplastic elastomer were Mw: 130,088, molecular weight distribution: 1.96, Tb: 5.7 MPa, Eb: 1018%, adhesion: 85 N, and heat resistance: 12.4%. Table 1 shows the results.

Example 6

To a container of a 200 L SUS-made polymerization device in which container nitrogen substitution had been carried out, 89.6 L of butyl chloride (dried by use of molecular sieves) and 38.4 L of hexane (dried by use of molecular sieves) were added via a pipe. The polymerization device was cooled by causing brine at −80° C. to pass through a jacket of the polymerization device, and then 25.3 L (268 mol) of an isobutylene monomer was added. Subsequently, 21.06 g (0.091 mol) of p-dicumylchloride and 55.3 g (0.4 mol) of triethylamine were added. Next, 694 ml (2.34 mol) of titanium tetraisopropoxide was added, and a temperature within the system was decreased to −70° C. Then, 1.8 L (16.4 mol) of titanium tetrachloride was added so as to initiate polymerization. Immediately after titanium tetrachloride was fed, a whole amount of a mixed solution of 215 g (1.82 mol) of p-methyl styrene, 925 g of butyl chloride, and 295 g of hexane was dripped by use of dripping equipment at a flow rate of 47.8 g/min over 30 minutes. A speed at which pMSt was fed per minute was 0.4 mM/min relative to a volume of a reaction solution at an end of dripping of pMSt. The reaction solution was extracted at any time during the reaction, and respective concentrations of isobutylene and p-methyl styrene were measured. As a result of the measurement, it was confirmed (i) that an unreacted portion of p-methyl styrene had a highest concentration at the end of dripping of p-methyl styrene and p-methyl styrene at that time had an amount of substance which amount was 1/528 (mol/mol) relative to a total amount of substance of isobutylene, i.e., a fed amount of the isobutylene monomer and (ii) that isobutylene and p-methyl styrene had been consumed together at a constant rate. After the elapse of 109 minutes from the feeding of titanium tetrachloride, it was confirmed by gas chromatography that 99% by weight of isobutylene and p-methyl styrene had been consumed. At that time, a random copolymer (polymer block (a)) of isobutylene and p-methyl styrene had a weight average molecular weight of 173,000, a number average molecular weight of 98,000, and a molecular weight distribution of 1.77. After the elapse of 120 minutes from the feeding of titanium tetrachloride, 3.655 L (31.7 mol) of a styrene monomer was fed. After the elapse of 176 minutes from the feeding of the styrene monomer, it was confirmed by gas chromatography that 81% by weight of the fed styrene monomer had been consumed. Subsequently, the reaction solution as a whole was poured into 125 L of a 2.8% by weight aqueous sodium hydroxide solution heated to 70° C., and a resultant solution was vigorously stirred for 60 minutes, so that polymerization was stopped. Next, washing with 125 L of pure water was repeated 2 times. Thereafter, a volatile matter such as a solvent was removed by distillation under heating and dried, so that 18.0 kg of a thermoplastic elastomer including a polystyrene block (polymer block (b)) and a methyl styrene-isobutylene copolymer (polymer block (a)) was obtained. The obtained thermoplastic elastomer had a weight average molecular weight of 188,000, a number average molecular weight of 116,000, and a molecular weight distribution of 1.61. Results of various physical properties of the thermoplastic elastomer were Tb: 5.57 MPa and Eb: 1089%. Table 1 shows the results.

In an 8 L flask, 800 g of the thermoplastic elastomer obtained by the above method was dissolved into 4187 g of 1-chlorobutane and 346 g of n-hexane. A resultant solution was subjected to nitrogen bubbling for 60 minutes, and thereafter the resultant solution was subjected to a nitrogen flow instead of the nitrogen bubbling. Further, 26 g of bromine ($Br_2$) was fed into the solution while light was blocked so as to prevent exposure of the system as a whole to light as much as possible. A resultant solution was sufficiently stirred, and it was confirmed that the solution had a uniform color. Then, a bromination reaction was carried out by light irradiation from outside the flask by use of 4 household visible light LED lamps (10 W). After the elapse of 105 minutes from a start of light irradiation, light irradiation was stopped. Then, 1125 g of a 3% by weight aqueous $Na_2SO_3$ solution was fed into a reaction solution, and a resultant solution was stirred until brown faded. Thereafter, the solution was subjected to stationary separation for 90 minutes, so that an aqueous phase was discharged from the solution. To the solution from which the aqueous phase was discharged, 1000.0 g of water was further added. Then, a resultant solution was stirred and left standing. Then, an aqueous phase was discharged from the solution. To the solution from which the aqueous phase was discharged, magnesium sulfate was added, so that a resultant solution was dehydrated. Thereafter, filtrate obtained by filtration of the resultant solution was dried overnight at 80° C. under vacuum, so that a thermoplastic elastomer into which bromine was introduced was obtained. After the bromination reaction, 87% of a methyl group of p-methyl styrene which methyl group had not been subjected to the bromination reaction was converted into a monobromomethyl group, and 5% of the methyl group was converted into a dibromomethyl group.

The obtained thermoplastic elastomer into which bromine was introduced had a weight average molecular weight of 175,000, a number average molecular weight of 77,000, and a molecular weight distribution of 2.28. Various results of the thermoplastic elastomer were Tb: 4.3 MPa, Eb: 877%, adhesion: 48 N, and heat resistance: 20.0%. Table 1 shows the results.

Example 7

To a 2 L separable flask in which nitrogen substitution had been carried out, 1202 mL of butyl chloride (dried by use of molecular sieves after distillation) and 515 mL of hexane (dried by use of molecular sieves after distillation) were added by use of a syringe. A polymerization container (the separable flask) was cooled by being immersed in dry ice/ethanol at −72° C., and then 421 mL (4.45 mol) of an isobutylene monomer was added. Subsequently, 0.7 g (3.03 mmol) of p-dicumylchloride and 3.1 g (22 mmol) of triethylamine were added. Next, 9.0 ml (30 mmol) of titanium tetraisopropoxide was added, and a temperature within the system was decreased to −70° C. Then, 23 mL (0.21 mol) of titanium tetrachloride was added so as to initiate polymerization. Immediately after titanium tetrachloride was fed, a whole amount of a mixed solution of 7.2 g (61 mmol) of p-methyl styrene, 4.6 g of butyl chloride, and 2.0 g of hexane was dripped by use of a syringe pump at a flow rate of 0.46 g/min over 30 minutes. A speed at which pMSt was fed per minute was 0.9 mM/min relative to a volume of a reaction solution at an end of dripping of pMSt. The reaction solution was extracted at any time during the reaction, and respective concentrations of isobutylene and p-methyl styrene were measured. As a result of the measurement, it was confirmed (i) that an unreacted portion of p-methyl styrene had a highest concentration at the end of dripping of p-methyl styrene and p-methyl styrene at that time had an amount of substance (mol) which amount was 1/183 (mol/mol) relative to a total amount of substance of isobutylene, i.e., a fed amount (mol) of the isobutylene monomer and (ii) that isobutylene and p-methyl styrene had been consumed together at a constant rate. After the elapse of 115 minutes from the feeding of titanium tetrachloride, it was confirmed by gas chromatography that 99% by weight of isobutylene and p-methyl styrene had been consumed. At that time, a random copolymer (polymer block (a)) of isobutylene and p-methyl styrene had a weight average molecular weight of 113,000, a number average molecular weight of 96,000, and a molecular weight distribution of 1.17. After the elapse of 135 minutes from the feeding of titanium tetrachloride, 61 ml (0.53 mol) of a styrene monomer was fed. After the elapse of 95 minutes from the feeding of the styrene monomer, it was confirmed by gas chromatography that 82% by weight of the fed styrene monomer had been consumed. Subsequently, the reaction solution as a whole was poured into 0.3 L of a 2.8% by weight aqueous sodium hydroxide solution heated to 50° C., and a resultant solution was vigorously stirred by use of a mechanical stirrer for 60 minutes, so that polymerization was stopped. Next, washing with 0.3 L of pure water was repeated 2 times. Thereafter, a volatile matter such as a solvent was removed by distillation under heating and dried, so that 307 g of a thermoplastic elastomer including a polystyrene block (polymer block (b)) and a methyl styrene-isobutylene copolymer (polymer block (a)) was obtained. The obtained thermoplastic elastomer had a weight average molecular weight of 142,000, a number average molecular weight of 104,000, and a molecular weight distribution of 1.36. Table 1 shows the results.

In a 5 L flask, 307 g of the thermoplastic elastomer obtained by the above method was dissolved into 1228 g of 1-chlorobutane. A resultant solution was subjected to nitrogen bubbling for 60 minutes, and thereafter the resultant solution was subjected to a nitrogen flow instead of the nitrogen bubbling. Further, 18.2 g (0.11 mmol) of bromine ($Br_2$) was fed into the solution while light was blocked so as to prevent exposure of the system as a whole to light as much as possible, and a resultant solution was stirred at a room temperature. After the elapse of 270 minutes from the feeding of bromine, 23.9 g of $NaHCO_3$ was added to the solution, and a resultant solution was stirred for 30 minutes. Then, 11.9 g of $NaHSO_3$ was added to a reaction solution, and a resultant solution was stirred at a room temperature until brown faded and a polymer solution had a neutral pH. Thereafter, the polymer solution was filtrated by use of a filter having a mesh size of 1μ, and filtrate was dried overnight at 80° C. under vacuum, so that a thermoplastic elastomer into which bromine was introduced was obtained. After a bromination reaction, 97% of a methyl group of p-methyl styrene which methyl group had not been subjected to the bromination reaction was converted into a monobromomethyl group, and 4% of the methyl group was converted into a dibromomethyl group.

The obtained thermoplastic elastomer into which bromine was introduced had a weight average molecular weight of 138,000, a number average molecular weight of 93,000, and a molecular weight distribution of 1.49. Various results of the thermoplastic elastomer were Tb: 4.8 MPa, Eb: 1060%, adhesion: 72 N, and heat resistance: 13.9%. Table 1 shows the results.

Example 8

Example 8 obtained a thermoplastic elastomer by carrying out operations as in the case of Example 7 except that Example 8 used 0.47 g (2.03 mmol) of p-dicumylchloride. A random copolymer (polymer block (a)) of isobutylene and p-methyl styrene had a weight average molecular weight of 160,000, a number average molecular weight of 131,000, and a molecular weight distribution of 1.22. A thermoplastic elastomer including a polystyrene block (polymer block (b)) and a methyl styrene-isobutylene copolymer (polymer block (a)) had a weight average molecular weight of 179,000, a number average molecular weight of 36,000, and a molecular weight distribution of 1.31. A speed at which pMSt was fed per minute was 0.9 mM/min relative to a volume of a reaction solution at an end of dripping of pMSt. P-methyl styrene which was being polymerized had a maximum amount of substance (mol) which maximum amount was 1/128 (mol/mol) relative to a total amount of substance of isobutylene, i.e., a fed amount (mol) of an isobutylene monomer, and isobutylene and p-methyl styrene had been consumed together at a constant rate.

Further, Example 8 carried out a reaction between the obtained thermoplastic elastomer and bromine ($Br_2$) as in the case of Example 7, so that a thermoplastic elastomer into which bromine was introduced was obtained. After a bromination reaction, 87% of a methyl group of p-methyl styrene which methyl group had not been subjected to the bromination reaction was converted into a monobromomethyl group, and 3% of the methyl group was converted into a dibromomethyl group. The obtained thermoplastic elastomer into which bromine was introduced had a weight average molecular weight of 169,000, a number average molecular weight of 109,000, and a molecular weight distribution of 1.55. Various results of the thermoplastic elastomer were Tb: 4.9 MPa, Eb: 1050%, adhesion: 74 N, and heat resistance: 19.8%. Table 1 shows the results.

Example 9

Example 9 obtained a thermoplastic elastomer by carrying out operations as in the case of Example 7 except that Example 9 used 0.35 g (1.52 mmol) of p-dicumylchloride, 11.6 ml (39 mmol) of titanium tetraisopropoxide, and 30 mL (0.27 mol) of titanium tetrachloride. A random copolymer (polymer block (a)) of isobutylene and p-methyl styrene had a weight average molecular weight of 189,000, a number average molecular weight of 158,000, and a molecular weight distribution of 1.20. A thermoplastic elastomer including a polystyrene block (polymer block (b)) and a methyl styrene-isobutylene copolymer (polymer block (a)) had a weight average molecular weight of 211,000, a number average molecular weight of 180,000, and a molecular weight distribution of 1.17. A speed at which pMSt was fed per minute was 0.9 mM/min relative to a volume of a reaction solution at an end of dripping of pMSt. P-methyl styrene which was being polymerized had a maximum amount of substance (mol) which maximum amount was 1/151 (mol/mol) relative to a total amount of substance of isobutylene, i.e., a fed amount (mol) of an isobutylene monomer, and isobutylene and p-methyl styrene had been consumed together at a constant rate.

Further, Example 9 carried out a reaction between the obtained thermoplastic elastomer and bromine ($Br_2$) as in the case of Example 7, so that a thermoplastic elastomer into which bromine was introduced was obtained. After a bromination reaction, 100% of a methyl group which had not been subjected to the bromination reaction was converted into a monobromomethyl group, and 0% of the methyl group was converted into a dibromomethyl group. The obtained thermoplastic elastomer into which bromine was introduced had a weight average molecular weight of 181,000, a number average molecular weight of 93,000, and a molecular weight distribution of 1.94. Various results of the thermoplastic elastomer were Tb: 3.8 MPa, Eb: 1064%, adhesion: 100 N, and heat resistance: 19.1%. Table 2 shows the results.

Example 10

Example 10 obtained a thermoplastic elastomer by carrying out operations as in the case of Example 7 except that Example 10 used 0.28 g (1.22 mmol) of p-dicumylchloride, 13.5 ml (46 mmol) of titanium tetraisopropoxide, and 35 mL (0.32 mol) of titanium tetrachloride. A random copolymer (polymer block (a)) of isobutylene and p-methyl styrene had a weight average molecular weight of 204,000, a number average molecular weight of 135,000, and a molecular weight distribution of 1.51. A thermoplastic elastomer including a polystyrene block (polymer block (b)) and a methyl styrene-isobutylene copolymer (polymer block (a)) had a weight average molecular weight of 190,000, a number average molecular weight of 93,000, and a molecular weight distribution of 1.93. A speed at which pMSt was fed per minute was 0.9 mM/min relative to a volume of a reaction solution at an end of dripping of pMSt. P-methyl styrene which was being polymerized had a maximum amount of substance (mol) which maximum amount was 1/146 (mol/mol) relative to a total amount of substance of isobutylene, i.e., a fed amount (mol) of an isobutylene monomer, and isobutylene and p-methyl styrene had been consumed together at a constant rate.

Further, Example 10 carried out a reaction between the obtained thermoplastic elastomer and bromine ($Br_2$) as in the case of Example 7, so that a thermoplastic elastomer into which bromine was introduced was obtained. After a bromination reaction, 80% of a methyl group of p-methyl styrene which methyl group had not been subjected to the bromination reaction was converted into a monobromomethyl group, and 0% of the methyl group was converted into a dibromomethyl group. The obtained thermoplastic elastomer into which bromine was introduced had a weight average molecular weight of 179,000, a number average molecular weight of 74,000, and a molecular weight distribution of 2.43. Various results of the thermoplastic elastomer were Tb: 0.4 MPa, Eb: 2500%, adhesion: 77 N, and heat resistance: 12.3%. Table 2 shows the results.

Example 11

Example 11 obtained a thermoplastic elastomer by carrying out operations as in the case of Example 7 except that Example 11 drip-fed a mixed solution of 3.6 g (30 mmol) of p-methyl styrene, 2.3 g of butyl chloride, and 1.0 g of hexane at a flow rate of 0.23 g/min. A random copolymer (polymer block (a)) of isobutylene and p-methyl styrene had a weight average molecular weight of 117,000, a number average molecular weight of 103,000, and a molecular weight distribution of 1.14. A thermoplastic elastomer including a polystyrene block (polymer block (b)) and a methyl styrene-isobutylene copolymer (polymer block (a)) had a weight average molecular weight of 148,000, a number average molecular weight of 129,000, and a molecular weight distribution of 1.15. A speed at which pMSt was fed per minute was 0.5 mM/min relative to a final volume of a reaction solution. P-methyl styrene which was being polymerized had a maximum amount of substance (mol) which maximum amount was 1/459 (mol/mol) relative to a total amount of substance of isobutylene, i.e., a fed amount (mol) of an isobutylene monomer, and isobutylene and p-methyl styrene had been consumed together at a constant rate.

Further, Example 11 carried out a reaction between the obtained thermoplastic elastomer and bromine ($Br_2$) as in the case of Example 7, so that a thermoplastic elastomer into which bromine was introduced was obtained. After a bromination reaction, 100% of a methyl group of p-methyl styrene which methyl group had not been subjected to the bromination reaction was converted into a monobromomethyl group, and 0% of the methyl group was converted into a dibromomethyl group. Various results of the obtained thermoplastic elastomer into which bromine was introduced were Tb: 8.5 MPa, Eb: 1075%, adhesion: 34 N, and heat resistance: 17.2%. Table 2 shows the results.

Example 12

Example 12 obtained a thermoplastic elastomer by carrying out operations as in the case of Example 11 except that Example 12 used 0.47 g (2.03 mmol) of p-dicumylchloride. A random copolymer (polymer block (a)) of isobutylene and p-methyl styrene had a weight average molecular weight of 154,000, a number average molecular weight of 126,000, and a molecular weight distribution of 1.23. A thermoplastic elastomer including a polystyrene block (polymer block (b)) and a methyl styrene-isobutylene copolymer (polymer block (a)) had a weight average molecular weight of 176,000, a number average molecular weight of 101,000, and a molecular weight distribution of 1.74. A speed at which pMSt was fed per minute was 0.5 mM/min relative to a final volume of a reaction solution. P-methyl styrene which was being polymerized had a maximum amount of substance (mol) which maximum amount was 1/370 (mol/mol) relative to a total amount of substance of isobutylene, i.e., a fed amount (mol) of an isobutylene monomer, and isobutylene and p-methyl styrene had been consumed together at a constant rate.

Further, Example 12 carried out a reaction between the obtained thermoplastic elastomer and bromine ($Br_2$) as in the case of Example 11, so that a thermoplastic elastomer into which bromine was introduced was obtained. After a bromination reaction, 97% of a methyl group of p-methyl styrene which methyl group had not been subjected to the bromination reaction was converted into a monobromomethyl group, and 0% of the methyl group was converted into a dibromomethyl group. Various results of the obtained thermoplastic elastomer into which bromine was introduced were Tb: 8.7 MPa, Eb: 965%, adhesion: 52 N, and heat resistance: 26.4%. Table 2 shows the results.

Example 13

Example 13 obtained a thermoplastic elastomer by carrying out operations as in the case of Example 5 except that Example 13 drip-fed 0.84 g (5.5 mmol) of p-chloromethyl styrene together with p-methyl styrene. A random copolymer (polymer block (a)) of isobutylene, p-methyl styrene, and p-chloromethyl styrene had a weight average molecular weight of 101,000, a number average molecular weight of 81,000, and a molecular weight distribution of 1.24. A thermoplastic elastomer including a polystyrene block (polymer block (b)) and a chloromethyl styrene-methyl styrene-isobutylene copolymer (polymer block (a)) had a weight average molecular weight of 125,000, a number average molecular weight of 88,000, and a molecular weight distribution of 1.42. Various results of the obtained thermoplastic elastomer were Tb: 4.76 MPa and Eb: 1160%. A speed at which pMSt was fed per minute was 1.1 mM/min relative to a volume of a reaction solution at an end of dripping of pMSt. P-methyl styrene which was being polymerized had a maximum amount of substance (mol) which maximum amount was 1/200 (mol/mol) relative to a total amount of substance of isobutylene, i.e., a fed amount (mol) of an isobutylene monomer, and isobutylene and p-methyl styrene had been consumed together at a constant rate. Table 2 shows the results.

Example 14

Into 96.3 g of toluene, 20.0 g of a brominated thermoplastic elastomer obtained in Example 3 was dissolved. Further, 16.6 g of potassium acrylate, 1.46 g of tetrabutylammonium, 0.08 g of Kyoward 700 (Registered Trademark, manufactured by Kyowa Chemical Industry Co., Ltd.), and 0.002 g of H-TEMPO (manufactured by Degussa AG) were fed, and a resultant mixture was stirred under heating at a temperature of 90° C. After the elapse of 1 hour since the temperature reached 90° C., a reaction solution was fed into a large excess of methanol so as to precipitate a thermoplastic elastomer into which an acryloyl group was introduced. Methanol was renewed several times so as to remove an impurity. Thereafter, a precipitate was dried overnight at 80° C. under vacuum, so that a thermoplastic elastomer into which an acryloyl group was introduced was obtained. $^1$H NMR of the thermoplastic elastomer into which an acryloyl group was introduced was measured. As a result of the measurement, it was confirmed that signals indicative of a monobromomethyl group completely disappeared and signals indicative of an acryloyl group were generated. From an integral value of the signals indicative of an acryloyl group, it was calculated that the acryloyl group was introduced with respect to 97% of the monobromomethyl group into which the acryloyl group had not been introduced. Various results of the thermoplastic elastomer which had been acryloylated were Tb: 4.50 MPa and Eb: 1205%.

Comparative Example 1

To a 2 L separable flask in which nitrogen substitution had been carried out, 274.5 mL of butyl chloride (dried by use of molecular sieves after distillation) and 117.6 mL of hexane (dried by use of molecular sieves after distillation) were added by use of a syringe. A polymerization container (the separable flask) was cooled by being immersed in dry ice/ethanol at −80° C., and then 93.9 mL (1.016 mol) of an isobutylene monomer was added. Subsequently, 0.160 g (0.69 mmol) of p-dicumylchloride and 0.210 g (2.1 mmol) of triethylamine were added. Next, 2.05 ml (0.691 mmol) of titanium tetraisopropoxide was added, and a temperature within the system was decreased to −70° C. Then, 5.30 mL (0.0484 mol) of titanium tetrachloride was added so as to initiate polymerization. Immediately after titanium tetrachloride was fed, a whole amount of 0.363 g of a mixed solution of 3.265 g (0.0276 mol) of p-methyl styrene, 5.78 g of butyl chloride, and 1.84 g of hexane was shot-fed by use of a syringe per minute over 30 minutes. An amount in which pMSt was fed per shot was 1.8 mM/shot relative to a final volume of a reaction solution. The reaction solution was extracted at any time during the reaction, and a concentration of p-methyl styrene was measured. As a result of the measurement, an unreacted portion of p-methyl styrene had a highest concentration at an end of feeding of p-methyl styrene and p-methyl styrene at that time had an amount of substance (mol) which amount was 1/83 (mol/mol) relative to a total amount of substance of isobutylene, i.e., a fed amount (mol) of the isobutylene monomer. After the elapse of 102 minutes from the feeding of titanium tetrachloride, it was confirmed by gas chromatography that 99% by weight of isobutylene and p-methyl styrene had been consumed. At that time, a random copolymer (polymer block (a)) of isobutylene and p-methyl styrene had a weight average molecular weight of 95,000, a number average molecular weight of 44,000, and a molecular weight distribution of 2.19. After the elapse of 125 minutes from the feeding of titanium tetrachloride, 13.85 ml (0.12 mol) of a styrene monomer was fed. After the elapse of 94 minutes from the feeding of the styrene monomer, it was confirmed by gas chromatography that 80% by weight of the fed styrene monomer had been consumed. Subsequently, the reaction solution as a whole was poured into 0.3 L of a 2.8% by weight aqueous sodium hydroxide solution heated to 70° C., and a resultant solution was vigorously stirred by use of a mechanical stirrer for 60 minutes, so that polymerization was stopped. Next, washing with 0.3 L of pure water was repeated 2 times. Thereafter, a volatile matter such as a solvent was removed by distillation under heating and dried, so that 70 g of a thermoplastic elastomer including a polystyrene block (polymer block (b)) and a methyl styrene-isobutylene copolymer (polymer block (a)) was obtained. The obtained thermoplastic elastomer had a weight average molecular weight of 107,000, a number average molecular weight of 59,000, and a molecular weight distribution of 1.80. Results of physical properties of the thermoplastic elastomer were Tb: 2.56 MPa and Eb: 1506%. Table 2 shows the results.

Comparative Example 2

To a container of a 200 L SUS-made polymerization device in which container nitrogen substitution had been carried out, 66.37 L of butyl chloride (dried by use of molecular sieves) and 21.189 mL of hexane (dried by use of molecular sieves) were added via a pipe. The polymerization device was cooled by causing brine at −80° C. to pass through a jacket of the polymerization device, and then 26.187 L (277.223 mol) of an isobutylene monomer was added. Subsequently, 43.576 g (0.189 mol) of p-dicumylchloride and 57.23 g (0.57 mol) of triethylamine were added. Next, 558 ml (1.89 mol) of titanium tetraisopropoxide was added, and a temperature within the system was decreased to −70° C. Then, 1.447 L (13.20 mol) of titanium tetrachloride was added so as to initiate polymerization. Immediately after titanium tetrachloride was fed, a whole amount of 0.520 g of a mixed solution of 0.891 kg (7.54 mol) of p-methyl styrene, 1.576 kg of butyl chloride, and 0.503 kg of hexane was supplied under pressure per 10 minutes so as to be shot-fed over 30 minutes. An amount in which pMSt was fed per shot was 13.8 mM/shot relative to a final volume of a reaction solution. The reaction solution was extracted at any time during the reaction, and a concentration of p-methyl styrene was measured. As a result of the measurement, an unreacted portion of p-methyl styrene had a highest concentration at an end of dripping of p-methyl styrene and p-methyl styrene at that time had an amount of substance (mol) which amount was 1/88 (mol/mol) relative to a total amount of substance of isobutylene, i.e., a fed amount (mol) of the isobutylene monomer. After the elapse of 100 minutes from the feeding of titanium tetrachloride, it was confirmed by gas chromatography that 99% by weight of isobutylene and p-methyl styrene had been consumed. At that time, a random copolymer (polymer block (a)) of isobutylene and p-methyl styrene had a weight average molecular weight of 97,000, a number average molecular weight of 55,000, and a molecular weight distribution of 1.75. After the elapse of 120 minutes from the feeding of titanium tetrachloride, 3.42 L (32.84 mol) of a styrene monomer was fed. After the elapse of 64 minutes from the feeding of the styrene monomer, it was confirmed by gas chromatography that 78% by weight of the fed styrene monomer had been consumed. Subsequently, the reaction solution as a whole was poured into 125 L of a 2.8% by weight aqueous sodium hydroxide solution heated to 70° C., and a resultant solution was vigorously stirred by use of a mechanical stirrer for 60 minutes, so that polymerization was stopped. Next, washing with 125 L of pure water was repeated 2 times. Thereafter, a volatile matter such as a solvent was removed by distillation under heating and dried, so that 19.05 kg of a thermoplastic elastomer including a polystyrene block (polymer block (b)) and a methyl styrene-isobutylene copolymer (polymer block (a)) was obtained. The obtained thermoplastic elastomer had a weight average molecular weight of 111,000, a number average molecular weight of 53,000, and a molecular weight distribution of 2.10. In tests of breaking strength: Tb and breaking elongation: Eb, each of which tests is a test of a physical property of a thermoplastic elastomer, it was impossible to measure a breaking strength: Tb and breaking elongation: Eb of the obtained thermoplastic elastomer, which strength was too low to measure. Table 2 shows results of this.

Comparative Example 3

To a 2 L separable flask in which nitrogen substitution had been carried out, 367 mL of butyl chloride (dried by use of molecular sieves after distillation) and 157 mL of hexane (dried by use of molecular sieves after distillation) were added by use of a syringe. A polymerization container (the separable flask) was cooled by being immersed in dry ice/ethanol at −72° C., and then 128 mL (1.36 mol) of an isobutylene monomer and 4.4 g (37 mmol) of p-methyl styrene were added. Subsequently, 0.21 g (0.92 mmol) of p-dicumylchloride and 0.93 g (6.7 mmol) of triethylamine were added. Next, 2.7 ml (9.2 mmol) of titanium tetraisopropoxide was added, and a temperature within the system was decreased to −70° C. Then, 7.1 mL (0.06 mol) of titanium tetrachloride was added so as to initiate polymerization. P-methyl styrene had a highest concentration at a start of polymerization and p-methyl styrene at that time had an amount of substance (mol) which amount was 1/37 (mol/mol) relative to a total amount of substance of isobutylene, i.e., a fed amount (mol) of the isobutylene monomer. After the elapse of 55 minutes from the feeding of titanium tetrachloride, it was confirmed by gas chromatography that 99% by weight of isobutylene and p-methyl styrene had been consumed. At that time, a random copolymer (polymer block (a)) of isobutylene and p-methyl styrene had a weight average molecular weight of 116,000, a number average molecular weight of 91,000, and a molecular weight distribution of 1.28. After the elapse of 72 minutes from the feeding of titanium tetrachloride, 19 ml (0.16 mol) of a styrene monomer was fed. After the elapse of 100 minutes from the feeding of the styrene monomer, it was confirmed by gas chromatography that 83% by weight of the fed styrene monomer had been consumed. Subsequently, the reaction solution as a whole was poured into 0.3 L of a 2.8% by weight aqueous sodium hydroxide solution heated to 50° C., and a resultant solution was vigorously stirred by use of a mechanical stirrer for 60 minutes, so that polymerization was stopped. Next, washing with 0.3 L of pure water was repeated 2 times. Thereafter, a volatile matter such as a solvent was removed by distillation under heating and dried, so that 93 g of a thermoplastic elastomer including a polystyrene block (polymer block (b)) and a methyl styrene-isobutylene copolymer (polymer block (a)) was obtained. The obtained thermoplastic elastomer had a weight average molecular weight of 136,000, a number average molecular weight of 90,000, and a molecular weight distribution of 1.51. Results of evaluation of various physical properties of the thermoplastic elastomer were Tb: 1.17 MPa and Eb: 1094%.

In a 1 L flask, 63 g of the thermoplastic elastomer obtained by the above method was dissolved into 271 g of 1-chlorobutane and 86 g of n-hexane. A resultant solution was subjected to nitrogen bubbling for 60 minutes, and thereafter the resultant solution was subjected to a nitrogen flow instead of the nitrogen bubbling. Further, 6.0 g (0.037 mmol) of bromine ($Br_2$) was fed into the solution while light was blocked so as to prevent exposure of the system as a whole to light as much as possible, and a resultant solution was stirred at a room temperature. After the elapse of 120 minutes from the feeding of bromine, 7.9 g of $NaHCO_3$ was added to the solution and a resultant solution was stirred for 30 minutes. Then, 3.9 g of $NaHSO_3$ was added to a reaction solution, and a resultant solution was stirred at a room temperature until brown faded and a polymer solution had a neutral pH. Thereafter, the polymer solution was filtrated by use of a filter having a mesh size of 1μ, and filtrate was dried overnight at 80° C. under vacuum, so that a thermoplastic elastomer into which bromine was introduced was obtained. After a bromination reaction, 99% of a methyl group of p-methyl styrene which methyl group had not been subjected to the bromination reaction was converted into a monobromomethyl group. Various results of the obtained thermoplastic elastomer into which bromine was introduced were Tb: 1.0 MPa, Eb: 1056%, adhesion: 48 N, and heat resistance: 8.4%. Table 2 shows the results.

Comparative Example 4

To a 2 L separable flask in which nitrogen substitution had been carried out, 1151 mL of butyl chloride (dried by use of molecular sieves after distillation) and 128 mL of hexane (dried by use of molecular sieves after distillation) were added by use of a syringe. A polymerization container (the separable flask) was cooled by being immersed in dry ice/ethanol at −72° C., and then 400 mL (4.23 mol) of an isobutylene monomer was added. Subsequently, 0.67 g (2.88 mmol) of p-dicumylchloride and 0.55 g (5.9 mmol) of α-picoline were added, and a temperature within the system was decreased to −70° C. Then, 4.5 mL (0.04 mol) of titanium tetrachloride was added so as to initiate polymerization. After the elapse of 55 minutes from the feeding of titanium tetrachloride, it was confirmed by gas chromatography that 99% by weight of isobutylene and p-methyl styrene had been consumed. At that time, an isobutylene homopolymer had a weight average molecular weight of 92,000, a number average molecular weight of 82,000, and a molecular weight distribution of 1.12. After the elapse of 73 minutes from the feeding of titanium tetrachloride, 46 ml (0.4 mol) of a styrene monomer was fed. Immediately thereafter, 11.9 g (0.1 mol) of p-methyl styrene was fed. After the elapse of 100 minutes from the feeding of the styrene monomer, it was confirmed by gas chromatography that 84% by weight of the fed styrene monomer had been consumed. Subsequently, the reaction solution as a whole was poured into 0.3 L of a 2.8% by weight aqueous sodium hydroxide solution heated to 50° C., and a resultant solution was vigorously stirred by use of a mechanical stirrer for 60 minutes, so that polymerization was stopped. Next, washing with 0.3 L of pure water was repeated 2 times. Thereafter, a volatile matter such as a solvent was removed by distillation under heating and dried, so that 281 g of an isobutylene polymer including a polystyrene-p-methyl styrene block was obtained. The obtained polymer had a weight average molecular weight of 117,000, a number average molecular weight of 95,000, and a molecular weight distribution of 1.23. Results of evaluation of various physical properties of the polymer were Tb: 14.6 MPa and Eb: 933%.

Further, Comparative Example 4 carried out a reaction between the obtained polymer and bromine ($Br_2$) as in the case of Example 4, so that a polymer into which bromine was introduced was obtained. After the bromination reaction, 50% of a methyl group of p-methyl styrene which methyl group had not been subjected to the bromination reaction was converted into a monobromomethyl group. The obtained polymer into which bromine was introduced had a weight average molecular weight of 118,000, a number average molecular weight of 97,000, and a molecular weight distribution of 1.22. Various results of the polymer were Tb: 12.1 MPa, Eb: 807%, adhesion: 19 N, and heat resistance: 10.4%. Table 2 shows the results.

CONCLUSION

As shown in Tables 1 and 2, as compared with Comparative Examples 1 through 3, Examples 1 through 13, in each of which an amount of substance of an unreacted portion of the alkylstyrene (B) during polymerization of the block (a) is maintained at not more than 1/90 relative to a total amount of substance of an isoolefin monomer, can be said to not only have higher Tb and thus have a more excellent mechanical strength unique to a thermoplastic elastomer, but also have more excellent adhesion and more excellent heat resistance. Note that Tables 1 and 2 each show a sum of an evaluation of adhesion and an evaluation of resistance as a comprehensive evaluation of adhesion and resistance.

Further, Examples 6, 8, 9, and 12, in each of which a halogenated polyisobutylene thermoplastic elastomer has 12 to 45 halogen group-containing units and has a number average molecular weight of 70,000 to 200,000, can be said to have both high adhesion and high heat resistance.

TABLE 1

| | | Unit | Ex. 1 | Ex. 2 | Ex. 3 | Ex. 4 |
|---|---|---|---|---|---|---|
| Feeding of pMSt | Method | | drip-feeding | drip-feeding | drip-feeding | drip-feeding |
| | Feeding speed | mM/min | 1.8 | 0.9 | 1.8 | 3.6 |
| | Time | min | 30 | 60 | 30 | 15 |
| | Maximum pMSt concentration ([pMSt]/[IB]) | mol/mol | 1/128 | 1/208 | 1/196 | 1/118 |
| Block (a) | $M_n$ | | 70,000 | 101,000 | 74,000 | 94,000 |
| | $M_w$ | | 99,000 | 108,000 | 100,000 | 101,000 |
| | Molecular weight distribution | | 1.41 | 1.07 | 1.35 | 1.08 |
| | Concentration of pMSt group | mol % | 1.99 | 2.50 | 2.21 | 2.39 |
| | Number of pMSt groups | unit | 34 | 47 | 38 | 42 |
| | Position of pMSt | | random in PIB | random in PIB | random in PIB | random in PIB |
| Block-structured polymer including block (a) and block (b) | $M_n$ | | 76,000 | 58,000 | 78,000 | 99,000 |
| | $M_w$ | | 117,000 | 115,000 | 119,000 | 125,000 |
| | Molecular weight distribution | | 1.53 | 1.99 | 1.52 | 1.26 |
| Result of tensile test (before halogenation) | Tb | MPa | 3.19 | 3.42 | 3.28 | 6.83 |
| | Eb | % | 1357 | 1178 | 1249 | 1187 |
| Halogenated block-structured polymer including block (a) and block (b) | $M_n$ | | | | 73000 | 86000 |
| | $M_w$ | | | | 119000 | 124000 |
| | Molecular weight distribution | | | | 1.63 | 1.44 |
| | Concentration of halogenated pMSt group | mol % | | | 2.21 | 1.42 |
| | Number of halogenated pMSt groups | unit | | | 38 | 25 |
| Result of tensile test (after halogenation) | Tb | MPa | | | 3.3 | 7.0 |
| | Eb | % | | | 965 | 1133 |
| Adhesion | Adhesion | N | | | 65 | 53 |
| | Evaluation | | | | 3 | 3 |
| Heat resistance | Heat resistance | % | | | 7.5 | 8.6 |
| | Evaluation | | | | 1 | 1 |
| Comprehensive evaluation of adhesion and heat resistance | | | | | 4 | 4 |

TABLE 1-continued

| | | Unit | Ex. 5 | Ex. 6 | Ex. 7 | Ex. 8 |
|---|---|---|---|---|---|---|
| Feeding of pMSt | Method | | drip-feeding | drip-feeding | drip-feeding | drip-feeding |
| | Feeding speed | mM/min | 1.1 | 0.4 | 0.9 | 0.9 |
| | Time | min | 30 | 30 | 30 | 30 |
| | Maximum pMSt concentration ([pMSt]/[IB]) | mol/mol | 1/227 | 1/528 | 1/183 | 1/128 |
| Block (a) | $M_n$ | | 94,000 | 98,000 | 96,000 | 131,000 |
| | $M_w$ | | 106,000 | 173,000 | 113,000 | 160,000 |
| | Molecular weight distribution | | 1.13 | 1.77 | 1.17 | 1.22 |
| | Concentration of pMSt group | mol % | 1.40 | 0.52 | 1.01 | 0.90 |
| | Number of pMSt groups | unit | 25 | 16 | 20 | 25 |
| | Position of pMSt | | random in PIB | random in PIB | random in PIB | random in PIB |
| Block-structured polymer including block (a) and block (b) | $M_n$ | | 112,000 | 116,000 | 104,000 | 136,000 |
| | $M_w$ | | 138,000 | 188,000 | 142,000 | 179,000 |
| | Molecular weight distribution | | 1.24 | 1.61 | 1.36 | 1.31 |
| Result of tensile test (before halogenation) | Tb | MPa | | 5.57 | | |
| | Eb | % | | 1089 | | |
| Halogenated block-structured polymer including block (a) and block (b) | $M_n$ | | 66000 | 77000 | 93000 | 109000 |
| | $M_w$ | | 130000 | 175000 | 138000 | 169000 |
| | Molecular weight distribution | | 1.96 | 2.28 | 1.49 | 1.55 |
| | Concentration of halogenated pMSt group | mol % | 1.38 | 0.58 | 1.01 | 0.81 |
| | Number of halogenated pMSt groups | unit | 26 | 18 | 20 | 23 |
| Result of tensile test (after halogenation) | Tb | MPa | 5.7 | 4.3 | 4.8 | 4.9 |
| | Eb | % | 1018 | 877 | 1060 | 1050 |
| Adhesion | Adhesion | N | 85 | 48 | 72 | 74 |
| | Evaluation | | 4 | 2 | 3 | 3 |
| Heat resistance | Heat resistance | % | 12.4 | 20.0 | 13.9 | 19.8 |
| | Evaluation | | 2 | 5 | 3 | 5 |
| Comprehensive evaluation of adhesion and heat resistance | | | 6 | 7 | 6 | 8 |

*Ex. stands for Example.

TABLE 2

| | | Unit | Ex. 9 | Ex. 10 | Ex. 11 | Ex. 12 | Ex. 13 |
|---|---|---|---|---|---|---|---|
| Feeding of pMSt | Method | | drip-feeding | drip-feeding | drip-feeding | drip-feeding | drip-feeding |
| | Feeding speed | mM/min | 0.9 | 0.9 | 0.5 | 0.5 | 1.1 |
| | Time | min | 30 | 30 | 30 | 30 | 30 |
| | Maximum pMSt concentration ([pMSt]/[IB]) | mol/mol | 1/151 | 1/146 | 1/459 | 1/370 | 1/200 |

TABLE 2-continued

| | | | | | | | |
|---|---|---|---|---|---|---|---|
| Block (a) | $M_n$ | | 158,000 | 135,000 | 103,000 | 126,000 | 81,000 |
| | $M_w$ | | 189,000 | 204,000 | 117,000 | 154,000 | 101,000 |
| | Molecular weight distribution | | 1.20 | 1.51 | 1.14 | 1.23 | 1.24 |
| | Concentration of pMSt group | mol % | 1.04 | 1.16 | 0.46 | 0.50 | — |
| | Number of pMSt groups | unit | 35 | 42 | 10 | 14 | — |
| | Position of pMSt | | random in PIB | random in PIB | random in PIB | random in PIB | random in PIB |
| Block-structured polymer including block (a) and block (b) | $M_n$ | | 180,000 | 98,000 | 129,000 | 101,000 | 88,000 |
| | $M_w$ | | 211,000 | 190,000 | 148,000 | 176,000 | 125,000 |
| | Molecular weight distribution | | 1.17 | 1.93 | 1.15 | 1.74 | 1.42 |
| Result of tensile test (before halogenation) | Tb | MPa | | | | | 4.76 |
| | Eb | % | | | | | 1160 |
| Halogenated block-structured polymer including block (a) and block (b) | $M_n$ | | 93000 | 74000 | | | |
| | $M_w$ | | 181000 | 179000 | | | |
| | Molecular weight distribution | | 1.94 | 2.43 | | | |
| | Concentration of halogenated pMSt group | mol % | 1.10 | 0.92 | 0.51 | 0.48 | |
| | Number of halogenated pMSt groups | unit | 37 | 33 | 11 | 13 | |
| Result of tensile test (after halogenation) | Tb | MPa | 3.8 | 0.4 | 8.5 | 8.7 | |
| | Eb | % | 1064 | 2500 | 1075 | 965 | |
| Adhesion | Adhesion | N | 100 | 77 | 34 | 52 | |
| | Evaluation | | 4 | 4 | 2 | 3 | |
| Heat resistance | Heat resistance | % | 19.1 | 12.3 | 17.2 | 26.4 | |
| | Evaluation | | 5 | 2 | 4 | 5 | |
| Comprehensive evaluation of adhesion and heat resistance | | | 9 | 6 | 6 | 8 | |

| | | Unit | Comp. Ex. 1 | Comp. Ex. 2 | Comp. Ex. 3 | Comp. Ex. 4 |
|---|---|---|---|---|---|---|
| Feeding of pMSt | Method | | shot-feeding | shot-feeding | initial collective feeding | collective feeding after St |
| | Feeding speed | mM/min | (1.8)[1] | (13.8)[1] | | |
| | Time | min | 30 | 30 | | |
| | Maximum pMSt concentration ([pMSt]/[IB]) | mol/mol | 1/83 | 1/88 | 1/37 | |
| Block (a) | $M_n$ | | 44,000 | 55,000 | 91,000 | 82,000 |
| | $M_w$ | | 95,000 | 97,000 | 116,000 | 92,000 |
| | Molecular weight distribution | | 2.19 | 1.75 | 1.28 | 1.12 |
| | Concentration of pMSt group | mol % | 2.37 | 2.47 | 2.27 | 2.20 |
| | Number of pMSt groups | unit | 39 | 42 | 46 | 35 |

TABLE 2-continued

| | | | | | | |
|---|---|---|---|---|---|---|
| | Position of pMSt | | random in PIB | random in PIB | random in PIB | random in PIB |
| Block-structured polymer including block (a) and block (b) | $M_n$ | | 59,000 | 53,000 | 90,000 | 95,000 |
| | $M_w$ | | 107,000 | 111,000 | 136,000 | 117,000 |
| | Molecular weight distribution | | 1.80 | 2.10 | 1.51 | 1.23 |
| Result of tensile test (before halogenation) | Tb | MPa | 2.56 | too low to measure | 1.17 | 14.6 |
| | Eb | % | 1506 | too low to measure | 1094 | 933 |
| Halogenated block-structured polymer including block (a) and block (b) | $M_n$ | | | | | 97000 |
| | $M_w$ | | | | | 118000 |
| | Molecular weight distribution | | | | | 1.22 |
| | Concentration of halogenated pMSt group | mol % | | | 2.35 | 1.10 |
| | Number of halogenated pMSt groups | unit | | | 47 | 18 |
| Result of tensile test (after halogenation) | Tb | MPa | | | 1.0 | 12.1 |
| | Eb | % | | | 1056 | 807 |
| Adhesion | Adhesion | N | | | 48 | 19 |
| | Evaluation | | | | 2 | 1 |
| Heat resistance | Heat resistance | % | | | 8.4 | 10.4 |
| | Evaluation | | | | 1 | 2 |
| Comprehensive evaluation of adhesion and heat resistance | | | | | 3 | 3 |

*Ex. stands for Example.

*Comp. Ex. stands for Comparative Example.

Although the disclosure has been described with respect to only a limited number of embodiments, those skilled in the art, having the benefit of this disclosure, will appreciate that various other embodiments may be devised without departing from the scope of the present invention. Accordingly, the scope of the invention should be limited only by the attached claims.

What is claimed is:

1. A method for producing a thermoplastic elastomer, the method comprising:

forming a first block by copolymerizing a C4-C7 isoolefin monomer and alkylstyrene in the presence of a polymerization initiator; and forming a second block by polymerizing aromatic vinyl monomers, wherein the thermoplastic elastomer comprises the first block and the second block, the formation of the first block comprises adding the alkylstyrene to a reaction solution containing the polymerization initiator and the C4-C7 isoolefin monomer by drip-feeding for not less than 10% of a total time of the formation of the first block, the alkylstyrene is represented by the following general formula (1):

(1)

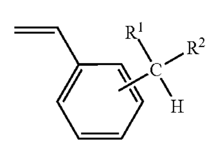

wherein $R^1$ and $R^2$ are each independently selected from the group consisting of a hydrogen atom, a halogen atom, a C1-C5 alkyl group, and a C1-C5 halogenated alkyl group, the alkylstyrene is added such that an amount of unreacted alkylstyrene is maintained at a molar ratio of not more than 1/90 relative to a total amount of the isoolefin monomer during the formation of the first block, and the polymerization initiator is represented by the following general formula (2):

(2)

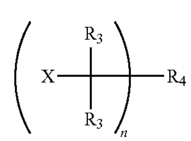

wherein $R^3$ is each independently a hydrogen atom or a C1-C6 monovalent hydrocarbon group; $R^4$ is a monovalent or polyvalent aromatic hydrocarbon group, or a monovalent or polyvalent aliphatic hydrocarbon group; X is each independently a halogen atom, a C1-C6 alkoxyl group, or a C1-C6 acyloxy group; and n is an integer of 1 to 6.

2. The method according to claim 1, wherein $R^1$ and $R^2$ are each independently a hydrogen atom or a C1-C5 alkyl group.

3. The method according to claim 1, wherein a molar ratio of the alkylstyrene to the polymerization initiator is 1:1 to 100:1.

4. The method according to claim 1, wherein the thermoplastic elastomer has a triblock structure comprising the first block and the second block, and wherein the first block is a block in the middle of the triblock structure and the second block is a block at both ends of the triblock structure.

5. The method according to claim 1, wherein the C4-C7 isoolefin monomer is isobutylene.

6. The method according to claim 1, wherein the alkylstyrene is p-methyl styrene, and the aromatic vinyl monomer is styrene.

7. The method according to claim 1, wherein the first block comprises a unit derived from the C4-C7 isoolefin monomer and a unit derived from the alkylstyrene that are randomly connected.

8. The method according to claim 1, wherein the thermoplastic elastomer is a block-structured polymer comprising the first block and the second block, and wherein the block-structured polymer has a weight average molecular weight of 5,000 to 1,000,000.

9. The method according to claim 1, wherein the thermoplastic elastomer is a block-structured polymer comprising the first block and the second block, and wherein a weight average molecular weight of the first block accounts for 60% to 95% of a weight average molecular weight of the block-structured polymer.

10. The method according to claim 1, wherein the first block has a molecular weight distribution of not more than 1.7.

11. The method according to claim 1, further comprising introducing a halogen group into the thermoplastic elastomer.

12. The method according to claim 11, further comprising introducing a functional group other than the halogen group by reacting the halogen group of the thermoplastic elastomer with a functionalizing agent.

13. The method according to claim 2, wherein a molar ratio of the alkylstyrene to the polymerization initiator is 1:1 to 100:1.

14. The method according to claim 2, wherein the thermoplastic elastomer has a triblock structure comprising the first block and the second block, and wherein the first block is a block in the middle of the triblock structure and the second block is a block at both ends of the triblock structure.

15. The method according to claim 3, wherein the thermoplastic elastomer has a triblock structure comprising the first block and the second block, and wherein the first block is a block in the middle of the triblock structure and the second block is a block at both ends of the triblock structure.

16. The method according to claim 2, wherein the C4-C7 isoolefin monomer is isobutylene.

17. The method according to claim 3, wherein the C4-C7 isoolefin monomer is isobutylene.

* * * * *